US009044705B2

United States Patent
Tada et al.

(10) Patent No.: US 9,044,705 B2
(45) Date of Patent: Jun. 2, 2015

(54) METHOD OF DEHUMIDIFYING AND DRYING POWDERED OR GRANULAR MATERIAL AND SYSTEM FOR DEHUMIDIFYING AND DRYING POWDERED OR GRANULAR MATERIAL

(75) Inventors: Hiroshi Tada, Hirakata (JP); Yu Jian Liu, Hirakata (JP); Masaaki Nosaka, Hirakata (JP)

(73) Assignee: KABUSHIKI KAISHA MATSUI SEISAKUSHO, Osaka (JP)

( * ) Notice: Subject to any disclaimer, the term of this patent is extended or adjusted under 35 U.S.C. 154(b) by 943 days.

(21) Appl. No.: 12/733,017

(22) PCT Filed: Jul. 31, 2008

(86) PCT No.: PCT/JP2008/063764
§ 371 (c)(1),
(2), (4) Date: Apr. 22, 2010

(87) PCT Pub. No.: WO2009/020042
PCT Pub. Date: Feb. 12, 2009

(65) Prior Publication Data
US 2010/0205821 A1      Aug. 19, 2010

(30) Foreign Application Priority Data

Aug. 3, 2007   (JP) ................................ 2007-202481

(51) Int. Cl.
*F26B 3/00* (2006.01)
*B01D 53/26* (2006.01)
(Continued)

(52) U.S. Cl.
CPC .............. *B01D 53/261* (2013.01); *B01D 53/06* (2013.01); *B01D 2253/108* (2013.01);
(Continued)

(58) Field of Classification Search
USPC ........... 34/428, 570, 449, 452, 472–474, 475, 34/477; 131/74; 110/293, 108, 105
See application file for complete search history.

(56) References Cited

U.S. PATENT DOCUMENTS 4,608,764 A * 9/1986 Leuenberger ................... 34/295
5,230,470 A * 7/1993 Rajan et al. ....................... 239/8
(Continued)

FOREIGN PATENT DOCUMENTS

| JP | S60-132622 | 7/1985 |
| JP | S60-115526 U | 8/1985 |
| JP | S60-178009 | 9/1985 |
| JP | H7-33110 U | 7/1995 |
| JP | H9-136033 | 5/1997 |
| JP | H10-185433 | 7/1998 |
| JP | H11-287557 | 10/1999 |

(Continued)

*Primary Examiner* — Kenneth Rinehart
*Assistant Examiner* — John McCormack
(74) *Attorney, Agent, or Firm* — DLA Piper LLP (US)

(57) ABSTRACT

A system for dehumidifying and drying a powdered or granular material having a drying hopper, a dehumidifying unit, and a circulation route having a processing gas supply route and a processing gas dehumidifying route that interconnect the drying hopper and the dehumidifying unit to allow processing gas to circulate is proposed. The system repeatedly supplies and circulates the processing gas in the circulation route. The processing gas supply route and the processing gas dehumidifying route are interconnected by a bypass route having a regulation valve. A temperature sensor for detecting the temperature of processing gas exhausted from the drying hopper is installed in the processing gas dehumidifying route. The system further has a control means for controlling opening or closing of the regulation valve, provided in the bypass route, based on a temperature detection signal detected by the temperature sensor. The control by the control means is performed under the condition that the total circulation amount of the processing gas circulated in the circulation route, including the amount of the gas passing through the bypass route, is held substantially constant.

20 Claims, 9 Drawing Sheets

(51) Int. Cl.
*B01D 53/06* (2006.01)
*F26B 9/06* (2006.01)
*F26B 17/14* (2006.01)
*F26B 21/04* (2006.01)
*F26B 21/06* (2006.01)
*F26B 21/08* (2006.01)

(52) U.S. Cl.
CPC ...... *B01D 2253/112* (2013.01); *B01D 2257/80* (2013.01); *B01D 2259/4009* (2013.01); *F26B 9/063* (2013.01); *F26B 17/1425* (2013.01); *F26B 21/04* (2013.01); *F26B 21/06* (2013.01); *F26B 21/083* (2013.01)

(56) References Cited

U.S. PATENT DOCUMENTS

| | | | | |
|---|---|---|---|---|
| 5,546,673 | A | * | 8/1996 | Weagraff et al. ............... 34/80 |
| 5,566,468 | A | * | 10/1996 | Graeff ............................. 34/80 |
| 7,007,402 | B1 | * | 3/2006 | Gillette .......................... 34/80 |
| 7,472,494 | B2 | * | 1/2009 | Moretto ......................... 34/416 |
| 7,875,833 | B2 | * | 1/2011 | Song ............................ 219/389 |

FOREIGN PATENT DOCUMENTS

| | | |
|---|---|---|
| JP | 2005-140497 | 6/2005 |
| JP | 3914566 | 2/2007 |

* cited by examiner

METHOD OF DEHUMIDIFYING AND DRYING POWDERED OR GRANULAR MATERIAL AND SYSTEM FOR DEHUMIDIFYING AND DRYING POWDERED OR GRANULAR MATERIAL

TECHNICAL FIELD

The present invention relates to an improvement of a method of dehumidifying and drying powdered or granular material stored in a drying hopper by circulating and regenerating a processing gas and a system of dehumidifying and drying powdered or granular material.

BACKGROUND ART

Conventionally used system of dehumidifying and drying powdered or granular material includes a drying hopper for storing a powdered or granular material, a dehumidifying unit having an absorbing body and a plurality of gas routes provided for them.

According to such a dehumidifying and drying system of powdered or granular material, for example, a processing gas which has been used for drying and dehumidifying a powdered or granular material in the drying hopper and is exhausted from the drying hopper is passed through a dehumidifying rotor (honeycomb rotor) which is filled with an absorbing agent (drying agent, moisture absorbing agent) and has a plurality of gas flow paths formed like a honeycomb. The moisture contained in the processing gas is absorbed at the dehumidifying rotor, thereby dehumidifying the processing gas, and the dehumidified processing gas is introduced in the drying hopper again to dehumidify and dry a powdered or granular material.

For example, the following patent document 1 suggests a dehumidifying and drying apparatus (drying apparatus of granulate material) in which a drying hopper (hopper for granulate material) of powdered or granular material (granulate material) and a honeycomb rotor (absorption dryer) including an absorbing agent (absorbing material) are interconnected with a plurality of air pipes (duct).

Such a conventional dehumidifying and drying apparatus is explained referring to FIG. 9.

The term used in the patent document 1 is described in parentheses for descriptive purposes.

FIG. 9 is a diagrammatic explanatory view schematically showing the conventional dehumidifying and drying apparatus.

The conventional dehumidifying and drying apparatus 1 in the figure roughly has a drying hopper 2 for storing a powdered or granular material, a honeycomb rotor 3 for dehumidifying a processing gas (air) exhausted from the drying hopper 2, and a plurality of air pipes 10-14 interconnecting them.

The honeycomb rotor 3 includes an absorbing agent such as silica gel and is designed to rotate in a clockwise direction (in a direction shown with an outlined arrow) and to continuously execute absorption of the moisture contained in the processing gas passing through the rotor 3 and regeneration of the absorbing body containing moisture.

Namely, the processing gas is dehumidified in a drying zone 3a in the honeycomb rotor 3, the absorbing agent in the honeycomb rotor 3 is recycled in a regenerating zone 3b, and the absorbing agent is cooled down in a cooling zone 3c.

The processing gas passed through the drying zone 3a becomes a dehumidified air being dehumidified by the absorbing agent (moisture is absorbed), passes through the air pipe 10, is heated by a heater 4 provided for the drying hopper 2, is introduced in the drying hopper 2, and is used for dehumidifying and drying a powdered or granular material.

The processing gas which has been used for dehumidifying and drying a powdered or granular material in the drying hopper 2 and contains moisture passes through the air pipe 11 connected above the drying hopper 2, the air pipe 13 connected to the air pipe 11, a filter 5, a cooler 6, and a blower 7, in this order, and is introduced into the honeycomb rotor 3 again via the air pipe 14.

Thus, the reason why the cooler 6 is provided upstream of the honeycomb rotor 3 is to protect the blower 7 positioned at its downstream and to increase the absorption amount of moisture by reducing the temperature of the heated and regenerated absorbing agent.

The air pipe 14 is diverged into an air pipe 14b for introducing a cooling gas in the cooling zone 3c, mentioned later, and an air pipe 14a for introducing a cooling gas into the drying zone 3a.

The absorbing agent having moisture in the drying zone 3a reaches the regenerating zone 3b.

In the regenerating zone 3b, heated air which is sucked by a regenerating blower 8 and is heated by a regenerating heater 9, passes through the regenerating zone 3b via an air pipe 15 as a hot air, and the temperature of absorbing agent is increased to eliminate moisture, thereby regenerating the absorbing agent with moisture.

The absorbing agent thus regenerated with a hot air in the regenerating zone 3b reaches the cooling zone 3c and is cooled down by a cooling gas introduced via the air pipe 14b in order to enhance the absorption ability of the absorbing agent. Thus used cooling gas flows via the air pipe 12 together with the processing gas which has been used for dehumidifying and drying a powdered or granular material in the drying hopper 2 and is exhausted therefrom, passes through the air pipe 13, the filter 5, the cooler 6, and the blower 7, in this order, and is introduced into the honeycomb rotor 3 again via the air pipe 14.

A collector (conveyor unit) 2a is provided above the drying hopper 2 and has a temperature sensor of powdered or granular material (temperature sensor of granulate material) 2b for measuring the temperature of the powdered or granular material temporarily stored in the collector 2a. Namely, the temperature of the powdered or granular material just before being charged in the drying hopper 2 is measured by the temperature sensor for powdered or granular material 2b.

Further, the air pipe 11 has a temperature sensor 11a for measuring the temperature of the processing gas exhausted from the drying hopper 2.

Based on the difference between the value measured by the temperature sensor 11a and the value measured by the temperature sensor of powdered or granular material 2b, the rotary speed of the blower 7 is changed by a control system 16 connected with each temperature sensor 2b, 11a, thereby adjusting the flow amount of the processing gas to be fed in the drying hopper 2.

The flow amount of the processing gas to be fed in the drying hopper 2 is adjusted such that the temperature difference between the value measured by the temperature sensor 11a and the value measured by the temperature sensor of powdered or granular material 2b becomes around 2 or 3 degrees centigrade.

According to such a structure of the dehumidifying and drying apparatus 1 described in the patent document 1, the processing gas can be continuously dehumidified by the honeycomb rotor 3 and the dehumidified gas can be continuously introduced into the drying hopper 2.

Further, the patent document 1 explains that energy can be saved when the flow amount of the processing gas to be fed in the drying hopper 2 is adjusted such that the temperature difference between the measured value by the temperature sensor 11a and the measured value by the temperature sensor of powdered or granular material 2b becomes around 2 or 3 degrees centigrade.

Namely, the flow amount of the processing gas to be fed in the drying hopper 2 is adjusted such that the temperature of the processing gas exhausted from the drying hopper 2 becomes 2 or 3 degrees centigrade higher than the temperature of the powder or granular material just before being charged to the upper part of the drying hopper 2. Accordingly, it is explained that successive energy wastage accompanied with cooling of the processing gas exhausted from the drying hopper 2 and with re-heating of the processing gas before feeding to the drying hopper 2 can be reduced.

Patent Document 1 Japanese Patent Application (not examined) JP-2005-140497-A

DISCLOSURE OF INVENTION

Problems to be Solved in Invention

According to the dehumidifying and drying apparatus 1 proposed in the patent document 1, energy saving is achieved by adjusting the flow amount of the processing gas to be fed in the drying hopper 2 in a manner such that the temperature difference between the temperature of the powdered or granular material just before being charged in the drying hopper 2 and the temperature of the processing gas exhausted from the drying hopper 2 becomes constant.

However, when the temperature of the powdered or granular material just before being charged in the drying hopper is low and the flow amount of the processing gas to be fed to the drying hopper 2 is adjusted so as to keep the temperature difference constant between the temperature of the powdered or granular material and the temperature of the processing gas exhausted from the drying hopper 2, the temperature of the powdered or granular material in the upper part in the drying hopper cannot be increased enough depending on the kinds and conditions (initial moisture content) of the powdered or granular material, so that the material is not well dried or a long time is required for drying. Namely, it is sometimes hard or takes long time to keep the temperature distribution of the powdered or granular material stored in the drying hopper constant and at high temperature.

Further, when the flow amount of the processing gas to be fed to the drying hopper 2 is adjusted as mentioned above, the flow amount of the cooling gas to be introduced for cooling the absorbing agent is also reduced, so that the absorbing agent is not cooled down well. Therefore, the absorption ability of moisture by the absorbing agent is not fully improved, so that it has been difficult to stabilize the dew point of the processing gas dehumidified by passing through the honeycomb rotor 3.

Namely, energy saving is achieved by reducing the flow amount of the processing gas to be fed in the drying hopper in a manner such that the temperature difference between the temperature of the powdered or granular material just before being charged in the drying hopper 2 and the temperature of the processing gas exhausted from the drying hopper 2 becomes constant. However, the flow amount of the cooling gas for cooling and regeneration is simultaneously reduced, the absorbing agent is not well cooled down and the moisture contained in the processing gas passing through the drying zone cannot be absorbed enough. Accordingly, the dew point of the processing gas to be fed to the drying hopper becomes high or unstable, so that the stored powdered or granular material is not dehumidified or dried well. Otherwise, there has been a problem that a long drying time is required.

The above-mentioned problems may be solved by introducing a cooling gas which is cooled down by another route, for example by means of outer air cooled down by a cooling means, into the honeycomb rotor in order to improve the absorption ability of the absorbing agent. However, when the outer air which has generally a dew point higher than that of the gas which is exhausted from the drying hopper and contains moisture while passing through the powdered or granular material is designed to be cooled down for regeneration by being introduced in the absorbing agent as a cooling gas for regeneration, the absorbing agent of which water is eliminated by heating and regenerating is subjected to absorb moisture again. Therefore, it is difficult to efficiently improve the absorption ability of moisture by the absorbing agent. In addition, in such a case, a suction means such as a blower is required to be separately provided for introducing the outer air.

The present invention is proposed in order to solve the above-mentioned problems and its object is to provide a dehumidifying and drying method of powdered or granular material which can achieve energy saving without disturbing the stability of the dew point of the processing gas dehumidified through the dehumidifying unit and a system of dehumidifying and drying the powdered or granular material.

Means to Solve Problem

In order to achieve the above-mentioned object, the first aspect of the present invention proposes a method of dehumidifying and drying powdered or granular material comprising a drying hopper for storing therein and drying a powdered or granular material, a dehumidifying unit equipped with an absorbing body therein, and a circulation route having a processing gas supply route and a processing gas dehumidifying route that interconnect the drying hopper and the dehumidifying unit, wherein a processing gas is repeatedly circulated for dehumidifying and drying by being returned to the dehumidifying unit from the drying hopper via the processing gas dehumidifying route after heated by a heater and allowed to pass through the drying hopper, in which the processing gas supply route and the processing gas dehumidifying route are interconnected with a bypass route. The method comprises the following process; a dehumidifying process in which the processing gas exhausted from the drying hopper is dehumidified with the absorbing body in the dehumidifying unit by allowing the processing gas to pass through the absorbing body; a heating regenerating process in which a heating gas is allowed to pass through the absorbing body for its own reuse after the dehumidifying process; and a cooling regenerating process in which a cooling gas is allowed to pass through the absorbing body for its own reuse after the heating regenerating process. Accordingly, the flow amount of the processing gas to pass through the bypass route is adjusted depending on the temperature of the processing gas exhausted from the drying hopper under the condition that the total circulation amount of the processing gas circulating in the circulation route, including the amount of the gas passing through the bypass route, is substantially kept a predetermined amount, thereby performing control of increasing or decreasing the flow amount of the processing gas to supply to the drying hopper.

Further, in order to achieve the above-mentioned problem, the second aspect of the present invention proposes a method of dehumidifying and drying powdered or granular material comprising a drying hopper for storing therein and drying a powdered or granular material, a dehumidifying unit equipped with an absorbing body therein, and a circulation route having a processing gas supply route and a processing gas dehumidifying route that interconnect the drying hopper and the dehumidifying unit, wherein a processing gas is repeatedly circulated for dehumidifying and drying by being returned to the dehumidifying unit from the drying hopper via the processing gas dehumidifying route after heated by a heater and allowed to pass through the drying hopper, in which the processing gas supply route and the processing gas dehumidifying route are interconnected with a bypass route. The method comprises the following process; a dehumidifying process in which the processing gas exhausted from the drying hopper is dehumidified with the absorbing body in the dehumidifying unit by allowing the processing gas to pass through the absorbing body; a heating regenerating process in which a heating gas is allowed to pass through the absorbing body for its own reuse after the dehumidifying process; and a cooling regenerating process in which a cooling gas is allowed to pass through the absorbing body for its won reuse after the heating regenerating process. Accordingly, the flow amount of the processing gas to pass through the bypass route is adjusted depending on the temperature in an upper part of the drying hopper under the condition that the total circulation amount of the processing gas circulating in the circulation route, including the amount of the gas passing through the bypass route, is substantially kept a predetermined amount, thereby performing control of increasing or decreasing the flow amount of the processing gas to supply to the drying hopper.

According to the dehumidifying and drying method of powdered or granular material in the above-mentioned first aspect and the second aspect of the present invention, in the dehumidifying unit, the processing gas is dehumidified by passing the processing gas exhausted from the drying hopper in the dehumidifying process and the absorbing body is heated and regenerated by passing the heated gas for regeneration after the processing gas is dehumidified in the heating regenerating process, and further the absorbing body is cooled down and regenerated by passing the cooling gas for regeneration after the heating regenerating process in the cooling regenerating process. Such a dehumidifying unit is provided in the circulation route of the processing gas having the bypass route and is constructed so as not to change the circulation flow amount of the processing gas in the entire route to be circulated in the circulation route including the bypass route. Accordingly the present invention can achieve that a dew point of the processing gas is stabilized even when the flow amount of the processing gas to be supplied in the drying hopper is changed.

Therefore, the structure of the dehumidifying unit is not considered as far as it has the above-mentioned basic structure and has requirement to follow the condition without changing the dew point of the processing gas.

This specification explains as a preferable embodiment a dehumidifying rotor which is superior in the uniformity of the dew point of the processing gas after dehumidifying process and has a plurality of gas flow paths formed like a honeycomb, however, the dehumidifying unit may be a multi-tower type. Or a dehumidify unit may have a plurality of dehumidifying rotors or a plurality of dehumidifying units may be provided.

The passing amount of the processing gas in the bypass route may be adjusted by a method of controlling open and close of a control valve provided for the bypass route. However, in the present invention, the temperature in the drying hopper is reduced each time the material is replenished under a normal operating condition which is executed after a fixed amount of material is replenished in the drying hopper. Accordingly, the passing amount in the bypass route is adjusted following the temperature of the processing gas (exhaust temperature) exhausted from the drying hopper of which temperature is reduced accordingly, or the temperature in the upper part in the drying hopper, and the flow amount of the processing gas into the drying hopper is adjusted to be increased or decreased correspondingly.

In such a control system, it is preferable to smoothly adjust the passing amount of the processing gas in the bypass route without rapidly changing the flow amount of the processing gas to be supplied in the drying hopper. In the following embodiment, a threshold value is provided for the exhaust temperature and the temperature in the upper part in the drying hopper, respectively and the open/close degree of the regulation valve of the bypass route is time controlled, thereby gradually increasing or decreasing the passing amount of the processing gas in the bypass route. Considering replenishing timing of material in the drying hopper and a delay element by the processing gas supply route, the flow amount is adjusted to be appropriate.

Adjustment of the passing amount of the processing gas in the bypass route may be executed by opening or closing the regulation valve so frequently that the passing amount per a unit time via the valves is set to be slightly changed, other than that the open or close of the regulation valve of the bypass route is time controlled.

In addition, in the dehumidifying and drying method of powdered or granular material in the second aspect of the present invention, the temperature of the upper part in the drying hopper may be the temperature of the space above the powdered or granular material layer stored in the drying hopper or it may be the temperature of the upper layer of the powdered or granular material stored in the drying hopper.

Further, in order to achieve the above-mentioned problem, the third aspect of the present invention proposes a system for dehumidifying and drying powdered or granular material comprising a drying hopper for storing therein and drying a powdered or granular material, a dehumidifying unit equipped with an absorbing body therein, and a circulation route having a processing gas supply route and a processing gas dehumidifying route that interconnect the drying hopper and the dehumidifying unit, wherein a processing gas is repeatedly circulated for dehumidifying and drying by being returned to the dehumidifying unit from the drying hopper via the processing gas dehumidifying route after heated by a heater and allowed to pass through the drying hopper, in which the processing gas supply route and the processing gas dehumidifying route are interconnected with a bypass route The system comprises the bypass route with a regulation valve, a temperature sensor provided in the processing gas dehumidifying route, for detecting the temperature of the processing gas exhausted from the drying hopper; and a control means for controlling open or close operation of the regulation valve provided in the bypass route depending on the temperature detection signal from the temperature sensor under the condition that the total circulation amount of the processing gas circulating in the circulation route, including the amount of the processing gas passing through the bypass route, is substantially kept a predetermined amount. The dehumidifying unit comprises a dehumidifying process zone for dehumidifying the processing gas exhausted from the drying hopper, so constructed as to allow the process gas to pass through the absorbing body; a heating regenerating zone so constructed as to allow a heating gas to pass through the absorbing body for reuse of the absorbing body after the processing gas is dehumidified; a cooling regenerating zone so constructed as to allow a cooling gas to pass through the absorbing body for reuse of the absorbing body after the absorbing body is regenerated by the heating gas; and an inlet and an outlet for introducing and passing the processing gas, the heating gas, and the cooling gas into and out of the dehumidifying process zone, the heating regenerating zone, and the cooling regenerating zone, respectively.

Further, in order to achieve the above-mentioned problem, the fourth aspect of the present invention proposes a system for dehumidifying and drying powdered or granular material comprising a drying hopper for storing therein and drying a powdered or granular material, a dehumidifying unit equipped with an absorbing body therein, and a circulation route having a processing gas supply route and a processing gas dehumidifying route that interconnect the drying hopper and the dehumidifying unit, wherein a processing gas is, repeatedly circulated for dehumidifying and drying by being returned to the dehumidifying unit from the drying hopper via the processing gas dehumidifying route after heated by a heater and allowed to pass through the drying hopper, in which the processing gas supply route and the processing gas dehumidifying route are interconnected with a bypass route. The system comprises the bypass route with a regulation valve, a temperature sensor provided in the drying hopper, for detecting the temperature in an upper part of the drying hopper; and a control means for controlling open or close operation of the regulation valve provided in the bypass route depending on the temperature detection signal from the temperature sensor under the condition that the total circulation amount of the processing gas circulating in the circulation route, including the amount of the processing gas passing through the bypass route, is substantially kept a predetermined amount. The dehumidifying unit comprising: a dehumidifying process zone for dehumidifying the processing gas exhausted from the drying hopper, so constructed as to allow the process gas to pass through the absorbing body; a heating regenerating zone so constructed as to allow a heating gas to pass through the absorbing body for reuse of the absorbing body after the processing gas is dehumidified; a cooling regenerating zone so constructed as to allow a cooling gas to pass through the absorbing body for reuse of the absorbing body after the absorbing body is regenerated by the heating gas; and an inlet and an outlet for introducing and passing the processing gas, the heating gas, and the cooling gas into and out of the dehumidifying process zone, the heating regenerating zone, and the cooling regenerating zone, respectively, The third aspect and the fourth aspect of the present invention are proposed as a dehumidifying and drying system of powdered or granular material for executing the methods of the first aspect and the second aspect of the present invention. The dehumidifying unit and the regulation valve of the bypass route in the third and the fourth aspects of the present invention have similar structures and functions of those in the first and the second aspects of the present invention.

Further according to the system of dehumidifying and drying powdered or granular material in the third and fourth aspects of the present invention, the regulation valve may be so constructed to be adjustable in its open degree.

In the dehumidifying and drying system of powdered or granular material in the fourth aspect of the present invention, the temperature sensor may detect the temperature of the space above the powdered or granular material layer stored in the drying hopper or the temperature of the upper layer of the powdered or granular material stored in the drying hopper.

Effect of Invention

According to the first to fourth aspects of the present invention, a powdered or granular material is dehumidified and dried while supplying the processing gas dehumidified by the absorbing body of the dehumidifying unit into the drying hopper. Comparing with the drying apparatus in which a powdered or granular material is dried while directly introducing the outer air heated with a heater into the drying hopper, the heater can be downsized (lower powered) or the drying time can be reduced. Namely, when an outside air is designed to be heated and directly introduced, a long time is required or a large-sized heater is required for drying a powdered or granular material in the drying hopper because the dew point of the outside air is high, although depending on seasons. However, according to the present invention, the processing gas of which dew point is lowered after dehumidified by the absorbing body is supplied in the drying hopper, so that a powdered or granular material can be dehumidified and dried effectively.

In addition, the flow amount of the processing gas to be supplied in the drying hopper is increased or decreased by adjusting the flow amount of the processing gas passing through the bypass route interconnecting the processing gas supply route and the processing gas dehumidifying route. Therefore, the flow amount of the processing gas to be supplied in the drying hopper can be increased or decreased without increasing or decreasing the flow amount of the processing gas passing through the dehumidifying unit.

Namely, the flow amount of the processing gas to be supplied in the drying hopper is designed to be increased or decreased under the condition that the entire circulation amount of the processing gas circulating in the circulation route, including the passing amount in the bypass route, is kept substantially constant. In other word, the flow amount of the processing gas to be supplied in the drying hopper is designed to be increased or decreased under the condition that the flow amount of the processing gas to be fed to the processing gas supply route via the dehumidifying unit and the flow amount thereof to be introduced into the dehumidifying unit via the processing gas dehumidifying route are held substantially constant.

Accordingly, a cooling regenerating process can be stably executed without disturbing the cooling regenerating process after the heating regenerating process of the absorbing body of the dehumidifying unit, thereby supplying the processing gas with a constant dew point into the drying hopper.

Further, according to the first and the third aspects of the present invention, the flow amount of the processing gas to be supplied to the drying hopper is designed to be increased or decreased based on the temperature (exhaust temperature) of the processing gas exhausted from the drying hopper. Still further according to the second and fourth aspects of the present invention, the flow amount of the processing gas to be supplied to the drying hopper is designed to be increased or decreased based on the temperature of the upper part in the drying hopper. Therefore, deterioration (oxidization, burn, decomposition, discoloration, and the like) of powdered or granular material, scattering of additive to a powdered or granular material caused by wasteful supply of processing gas in the drying hopper are prevented, and the burden on the cooling means by the overheated processing gas exhausted from the drying hopper is reduced. Further, when the temperature of the exhausting air or the temperature of the upper part in the drying hopper become high, the temperature of the powdered or granular material stored in the drying hopper becomes high enough to proceed a drying process without problem. Accordingly, the operating rates of the heater for heating the processing gas to be supplied in the drying hopper can be cut by reducing the flow amount of the processing gas to be supplied to the drying hopper, thereby saving electric power.

In addition, when the flow amount of the processing gas to be passed in the bypass route becomes maximum, the processing gas is supplied to the drying hopper via the processing gas supply route. Accordingly, when the powdered or granular material is discharged from the drying hopper or is charged thereinto, and the temperature distribution of the powdered or granular material in the drying hopper is changed, the temperature distribution of powdered or granular material can be smoothly transferred to a normal range.

The absorbing body of the dehumidifying unit may be constituted with the dehumidifying rotor in which a plurality of gas flow paths are formed like a honeycomb and the dehumidifying rotor may be divided into three zones around the rotary axis, namely the dehumidifying process zone, the heating regenerating zone, and the cooling regenerating zone. The processing gas, the heating gas for regeneration and the cooling gas for regeneration may be passed through each zone and the dehumidifying rotor is continuously rotated, then the dehumidifying process of the processing gas, the heating regenerating process of a part of the dehumidifying rotor, and the cooling regenerating process of a part of the dehumidifying rotor may be executed in parallel.

In this case, the dehumidifying process of the processing gas exhausted from the drying hopper, the heating regenerating process of a part of the dehumidifying rotor and the cooling regenerating process of a part of the dehumidifying rotor can be continuously executed, so that the processing gas with constant dew point can be supplied in the drying hopper.

Namely, for example, when the dehumidifying process of the processing gas and regeneration of the dehumidifying rotor are designed to be repeated in chronologic order, or when the dehumidifying process of the processing gas and regeneration of an absorption tower are executed in parallel by switching a plurality of absorption towers, it is difficult to keep constant dew point of the processing gas to be supplied in the drying hopper. However, when it is designed to be mentioned above, the processing gas with stable and substantially constant dew point can be supplied in the drying hopper.

Specifically the flow amount of the processing gas to be passed through the bypass route is designed to be increased or decreased by controlling the open degree of the regulation valve provided for the bypass route, not by simply controlling the ON/OFF of an on-off valve, thereby minutely adjusting increase and decrease of the flow amount of the processing gas to be passed through the bypass route. Namely, the flow amount of the processing gas to be supplied to the drying hopper can be minutely adjusted.

Still further, the flow amount of the processing gas to be passed through the bypass route is designed to be gradually increased when the temperature of the processing gas exhausted from the drying hopper becomes higher than a threshold value set in advance. On the other hand, the flow amount is designed to be gradually decreased when it becomes lower than the threshold value. In such a case, the flow amount of the processing gas to be sent to the bypass route is gradually increased when the temperature exceeds the threshold value, and the flow amount is decreased when the temperature becomes lower than the threshold value.

Namely, when the exhaust temperature becomes higher than the threshold value, the flow amount of the processing gas to the drying hopper is gradually decreased and when the temperature becomes lower than the value, the flow amount is gradually increased. As the result, when a threshold value is set in advance based on the kinds and the conditions of the powdered or granular material to be dried, the flow amount of the processing gas to be supplied in the drying hopper can be increased or decreased, thereby effectively executing suitable drying depending on the material while reducing electric power.

As mentioned above, the flow amount of the processing gas to the drying hopper is gradually decreased or gradually increased, so that the flow amount is not rapidly changed. Therefore, the temperature control of the processing gas by ON/OFF control of the heater is stably followed. Namely, when the flow amount of the processing gas to the drying hopper is rapidly changed, there is a possibility that the temperature control of the processing gas by ON/OFF control of the heater cannot be followed, and for example, overshoot or undershoot may be caused. However, such a fear can be reduced by the structure mentioned above.

BRIEF DESCRIPTION OF DRAWINGS

FIG. 3a is a time chart schematically showing the exhaust temperature and FIG. 3b is a time chart diagrammatically showing the open degree of the valve and the flow amount of the processing gas.

Figure 1:
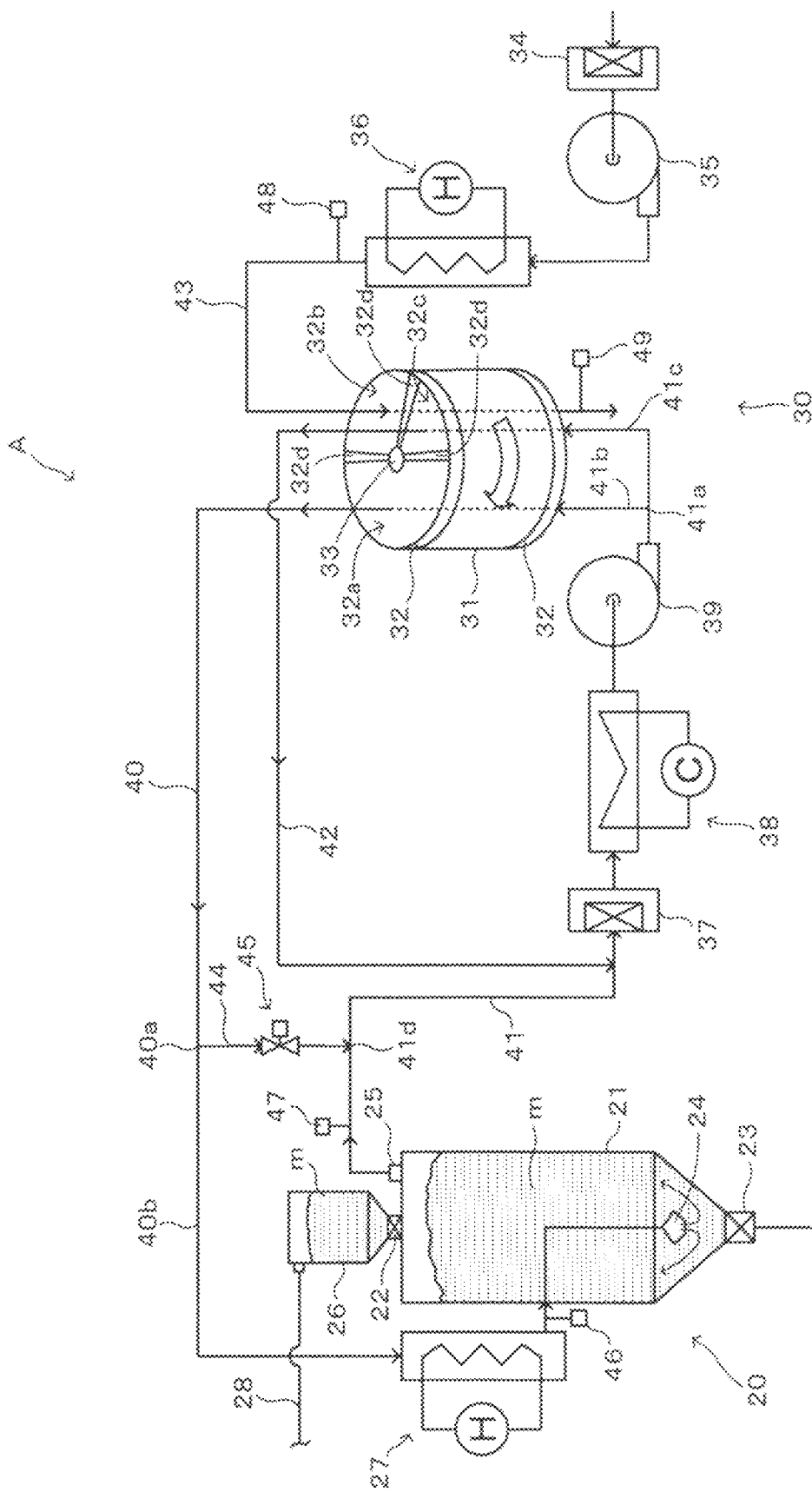
FIG. 1 is a diagrammatic explanatory view schematically showing one embodiment of the dehumidifying and drying system of powdered or granular material according to the present invention.

EXPLANATION OF REFERENCE 21 hopper body (drying hopper)
27 heater
30 dehumidifying unit
31 honeycomb rotor (absorbing body, dehumidifying rotor)
32 cover (inlet for introduction, outlet for introduction)
32a dehumidifying process zone
32b heating regenerating zone 32c cooling regenerating zone
32d partition wall (compartment forming means)
40 processing gas supply route (circulation route of processing gas)
40b supply route at hopper side (processing gas supply route, processing gas circulation route)
41 processing gas dehumidifying route (processing gas circulation route)
41b diverging pipe at dehumidifying side (processing gas dehumidifying route, processing gas circulation route)
44 bypass route
45 flow regulation valve (regulation valve)
47 exhaust temperature sensor (temperature sensor)
47A, 47B, 47C temperature sensor in upper part (temperature sensor)
51 CPU (control means)
53 memory means
A, B, C, D dehumidifying and drying system
m powdered or granular material
nhm powdered or granular material under heating process (upper layer of powdered or granular material)
npm powdered or granular material which is newly charged (upper layer of powdered or granular material)
sp space above powdered or granular material layer

BEST MODE FOR CARRYING OUT INVENTION

The preferable embodiment for carrying out the present invention is explained referring to the drawings.

Figure 2:
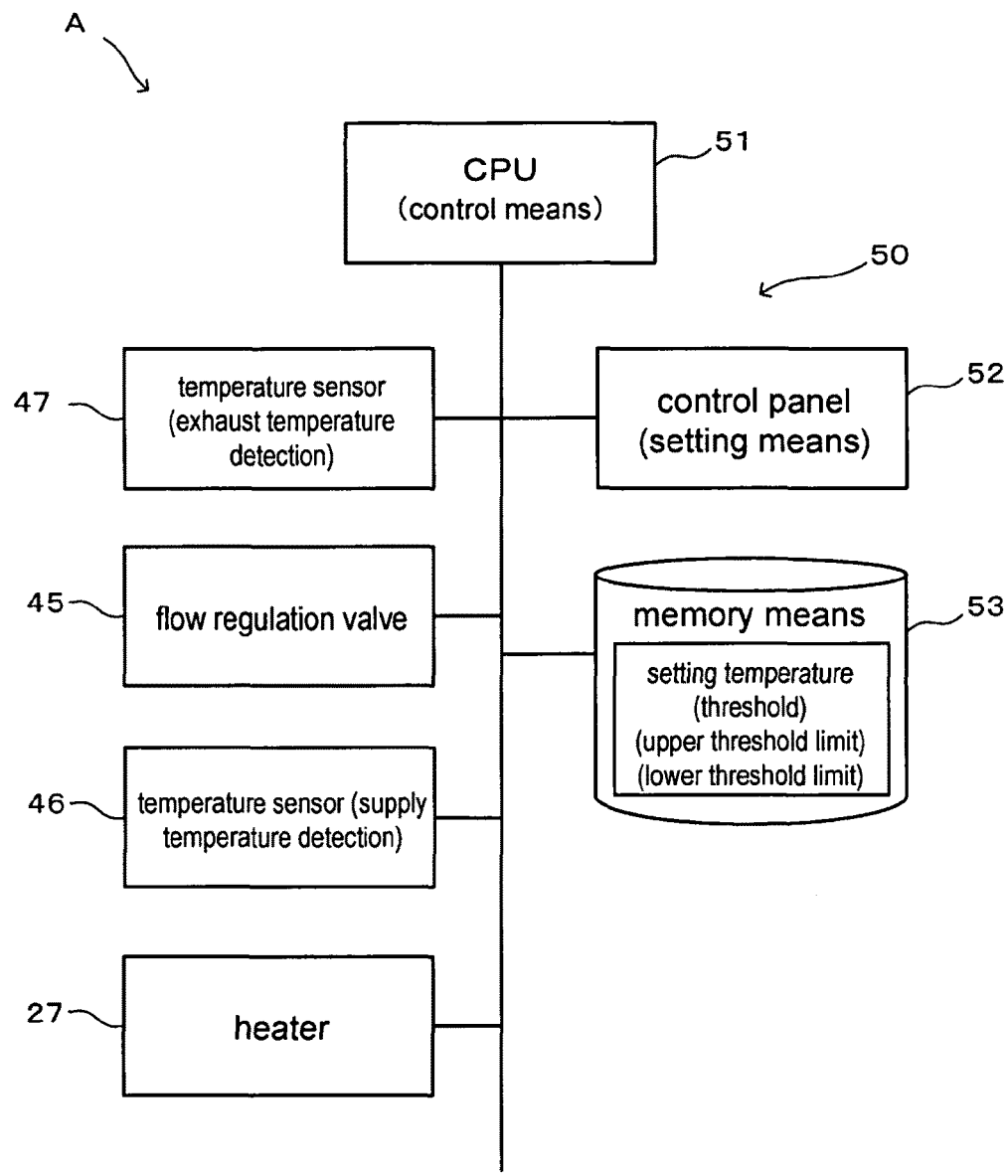
FIG. 2 is a block diagram showing the internal structure of the dehumidifying and drying system of powdered or granular material according to the embodiment.
Figure 3:
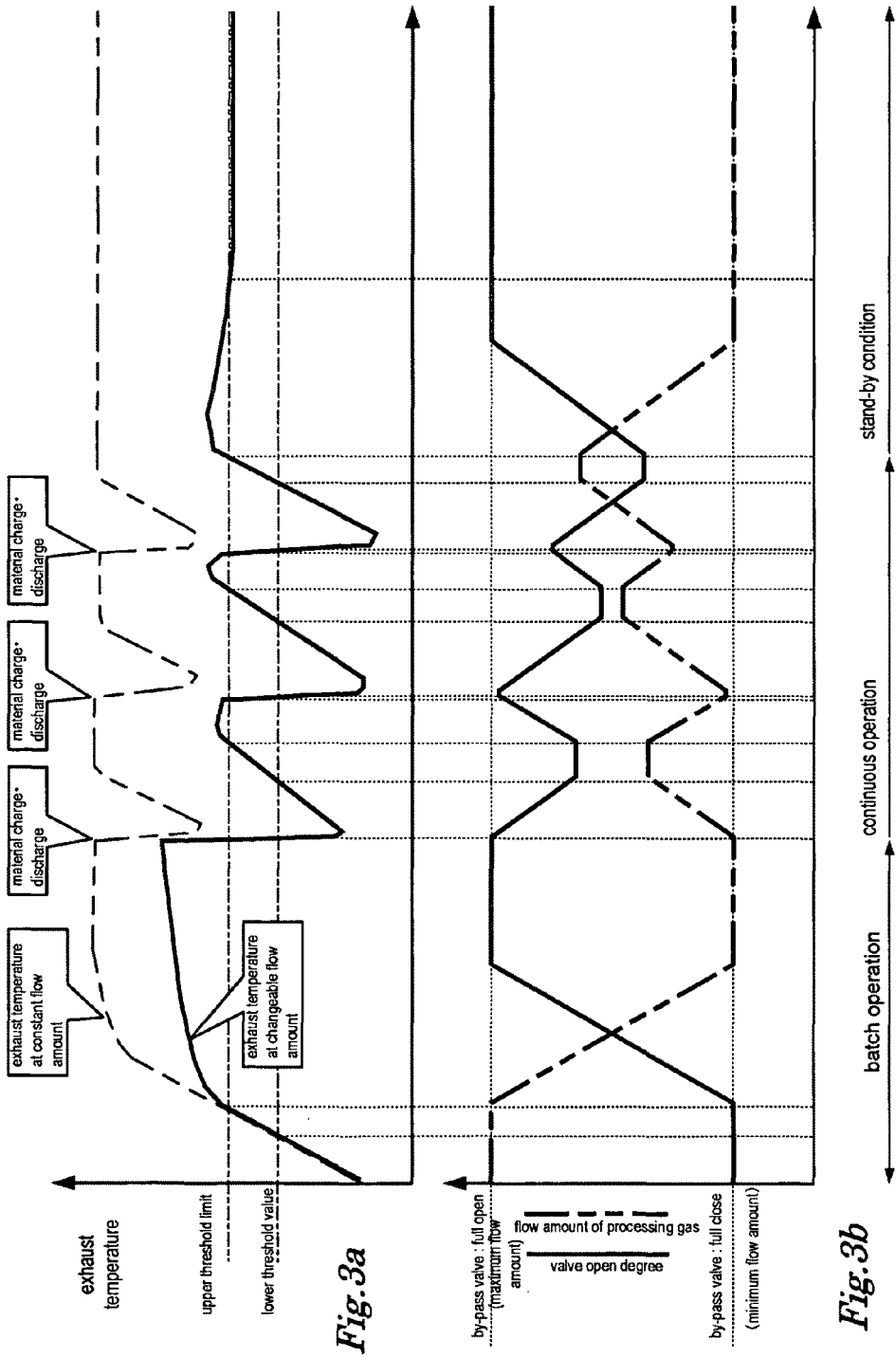
FIG. 3 is an example of a time chart for explaining the dehumidifying and drying process of a powdered or granular material executed in the dehumidifying and drying system of powdered or granular material according to the embodiment.

FIG. 1 is a diagrammatic explanatory view schematically showing one of the first embodiment of the dehumidifying and drying system of powdered or granular material according to the present invention. FIG. 2 is a block diagram showing the internal structure of the dehumidifying and drying system of powdered or granular material according to the embodiment. FIG. 3 is an example of a time chart for explaining the dehumidifying and drying process of powdered or granular material executed in the dehumidifying and drying system of powdered or granular material according to the embodiment, FIG. 3a is a time chart schematically showing the exhaust temperature and FIG. 3b is a time chart diagrammatically showing the open degree of the valve and the flow amount of the processing gas. FIG. 4a and FIG. 4b are other examples of the time chart corresponding to FIG. 3.

The dehumidifying and drying system of powdered or granular material A in the figure schematically has a drying hopper unit 20; a dehumidifying unit 30; processing gas circulation routes 40, 40b, 41, 41b having a processing gas supply route 40 including a supply route 40b at hopper side, a processing gas dehumidifying route 41, and a diverging pipe 41b constituting a part of the processing gas dehumidifying route; a diverging pipe at regenerating side 41c diverged from the processing gas dehumidifying route 41; a cooling gas route for regeneration 42; a heating gas route for regeneration 43; a bypass route 44; and a control part 50 (see FIG. 2) provided for an appropriate portion in the system A.

The lower part of the drying hopper unit 20 is conical and the upper part is cylindrical. The drying hopper 20 has a hopper body (drying hopper) 21 for storing a powdered or granular material (m) sequentially charged from the top, and a heater 27 for heating the processing gas supplied through the dehumidifying unit 30, as mentioned later.

A collector 26 is connected above the hopper body 21 for temporally storing the powdered or granular material (m) transported via a material transport pipe 28 from a material tank (not shown) and the powdered or granular material (m) is sequentially charged into the hopper body 21 by opening a material charge valve 22 provided under the collector 26.

The powdered or granular material (m) sequentially charged in the hopper body 21 is dehumidified and dried as mentioned later and is sequentially discharged to a next step such as a resin molding machine or a temporary storage hopper (not shown).

Charging of the powdered or granular material (m), as mentioned above, is done based on the signal of a material sensor (not shown) such as a level gage provided at the upper part in the hopper body 21, and is controlled in such a manner that the material is sequentially charged corresponding to the amount discharged from the material discharge valve 23 and the storage amount of the powdered or granular material (m) is substantially constant in the hopper body 21. Namely, the powdered or granular material (m) which is stored in a layered condition in the hopper body 21 and is dehumidified and dried is sequentially discharged from the lowest layer and a new powdered or granular material (m) is charged from the top corresponding to the discharged amount.

The powdered or granular material (m) refers to powder and granule such as synthetic resin pellet in this specification, however it is not limited to them, and it includes materials which require dehumidifying and drying at production process such as minute flake material, short fiber material, or powdered or granular material for food processing material and medical material Charging and discharging of the powdered or granular material (m) as mentioned above may be continuously or intermittently executed in a manner such that the stored amount in the hopper body 21 becomes a certain level.

A discharge port 24 is provided at the lower part in the hopper body 21 for discharging the processing gas sent via the processing gas supply route 40 into the hopper body 21.

The discharge port 24 is provided at a substantial center, in a plan view, of the hopper body 21 which is formed circular in a plan view and is designed to supply the gas sent through the processing gas supply route 40 in a uniform and diffused manner.

The processing gas discharged from the discharge port 24 upwardly passes through the powdered or granular material (m) stored in the hopper body 21 and is sent to the processing gas dehumidifying route 41 from an exhaust port 25 provided on the hopper body 21.

The dehumidifying unit 30 is a honeycomb type dehumidifying unit having a honeycomb rotor (dehumidifying rotor) constituting an absorbing body provided with an absorbing agent, a cover 32 provided at an upper end and a lower end, and the like.

The honeycomb rotor 31 is a cylindrical body in which an absorbing agent is impregnated in ceramic fibers formed like honeycomb and a plurality of gas flow paths are provided along the axial direction and is rotatable around a rotary axis 33 in a clockwise direction (in the direction shown with an outlined arrow) by a driving means like a motor (not shown). For example, the honeycomb rotor 31 continuously rotates at a low speed of 10 to 20 rotation speed per an hour (10-20 rph).

The absorbing agent used in the honeycomb rotor 31 includes silica gel, titanium silica gel, lithium chloride, synthetic zeolite (name of commodity molecular sieve), however, any solid agent may be used as far as it can absorb moisture and can be regenerated (moisture is eliminated) when the heating gas for recycle, mentioned later, passes therein.

The cover 32 provided at the upper and lower ends of the honeycomb rotor 31 has an inlet for introducing the processing gas from each route and an outlet for deriving the gas into each route. The cover 32 has a partition wall 32d constituting a compartment formation means to form a dehumidifying process zone 32a, a heating regenerating zone 32b, and a cooling regenerating zone 32c. Three partition walls 32d are provided around the rotary axis 33 of the honeycomb rotor 31 into centrifugal directions in a manner such that the capacity ratio of the dehumidifying process zone 32a, the heating regenerating zone 32b, and the cooling regenerating zone 32c becomes 5:2:1 in this embodiment.

The cover 32 is fixedly provided and is designed such that the honeycomb rotor 31 is divided into three compartments (zone) by three partition walls 32d provided for the cover 32 when the honeycomb rotor 31 rotates relative to the cover 32.

The cover 32 is provided in pair at up and down and the lower cover 32 in the figure is provided with similar three partition walls 32d corresponding to the partition walls 32d of the upper cover 32.

Detail description of the specific structure of the above-mentioned honeycomb type dehumidifying unit is omitted, however, a honeycomb-type dehumidifying unit disclosed in Japanese Utility Model Publication (not examined) S60-115526-U, Japanese Utility Model Publication (not examined) H01-167318-U, and Japanese Utility Model Publication (not examined) H02-13994 may be applied in the present embodiment.

The processing gas circulation route has the processing gas supply route 40 for sending the processing gas dehumidified when passing through the dehumidifying unit 30 to the drying hopper unit 20, the processing gas dehumidifying route 41 for sending the processing gas which has been used for dehumidifying and drying process of the powdered or granular material (m), mentioned later, and contains moisture into the dehumidifying unit 30 and the diverging pipe at dehumidifying side 41b which is diverged from the processing gas dehumidifying route 41 and constitute a part thereof.

The processing gas supply route 40 has a connecting portion 40a and is connected with a bypass route 44, mentioned later, in its midway.

The processing gas dehumidifying route 41 has a connecting portion 41d and is connected with the bypass route 44, mentioned later, in its midway.

The processing gas dehumidifying route 41 has an exhaust temperature sensor 47, a circulation filter 37, a cooler 38, and a main blower 39 in this order, and a diverging portion 41a constituting a distribution means is provided at downstream of the main blower 39. Driving the main blower 39, the processing gas is supplied and circulated.

A diverging pipe at regenerating side 41c communicated with the cooling regenerating zone 32c, mentioned later, is formed downstream of the diverging portion 41a.

The exhaust temperature sensor 47 is a temperature sensor for detecting the temperature of the processing gas exhausted from the hopper body 21 and is provided for the processing gas dehumidifying route 41 between the exhaust port 25 of the hopper body 21 and the connecting portion 41d of the bypass route 44, mentioned later.

The cooling gas route for regeneration 42 is connected to the above-mentioned processing gas dehumidifying route 41 of which downstream end is positioned between the hopper body 21 and the circulation filter 37 and makes the cooling gas for regeneration through the honeycomb rotor 31 via the above-mentioned diverting pipe at regenerating side 41c flow together with the above-mentioned processing gas dehumidifying route 41. Namely, in this embodiment, the cooling gas for regeneration passes through the honeycomb rotor 31 to be circulated together with the processing gas passing through the drying hopper unit 20 by driving the main blower 39 provided midway of the processing gas dehumidifying route 41, like the processing gas circulating in the above-mentioned circulation route. In other words, a part of the processing gas circulating between the drying hopper unit 20 and the dehumidifying unit 30 is distributed by the diverging portion 41a, passes through the honeycomb rotor 31 as a cooling gas for recycle, and flows together with the processing gas passed through the drying hopper unit 20 in the processing gas dehumidifying route 41 via the cooling gas route for regeneration 42.

The heating gas route for regeneration 43 has a suction filter 34, a blower for regeneration 35, and a heater for regeneration 36 are provided in this order from the upstream to the honeycomb rotor 31. The heating gas route for regeneration 43 is designed such that outside air is introduced via the suction filter 34 by the blower for regeneration 35 and is heated by the heater for regeneration 36, then a heating gas for regeneration is generated, and the generated heating gas for regeneration is introduced into the honeycomb rotor 31.

The temperature of the heating gas for regeneration which is heated by the heater for regeneration 36 and introduced may be around 180 to 240 degrees centigrade in order to eliminate moisture from the absorbing agent which contains moisture.

The bypass route 44 interconnects the processing gas supply route 40 and the processing gas dehumidifying route 41 and is provided with a flow regulation valve (regulation valve) 45 for adjusting the flow amount of the processing gas to be passed through the bypass route 44 in its midway.

Namely, the upstream end of the bypass route 44 is connected to the connecting portion 40a of the processing gas supply route 40 and its downstream end is connected to the connecting portion 41d of the processing gas dehumidifying route 41 positioned between the hopper body 21 and the circulation filter 37.

The pipe diameter of the bypass route 44 is designed such that about half of the processing gas among the gas to be sent in the processing gas supply route 40 is distributed in the bypass route 44 when the flow regulation valve 45 is fully opened. Namely, the flow amount of the processing gas to be supplied in the hopper body 21 when the flow regulation valve 45 is fully open is substantially half comparing to the case when the flow regulation valve 45 is fully closed.

The flow regulation valve 45 is constituted with a valve capable of controlling open degree like a motor valve and its open degree is controlled by a CPU 51 constituting a control means, mentioned later.

A part of the processing gas sent in the processing gas supply route 40 is sent in the bypass route 44 by opening or closing the flow regulation valve 45 and a part of the dehumidified processing gas is circulated into the dehumidifying unit 30 without reaching the hopper body 21.

Namely, the processing gas which is dehumidified in the dehumidifying unit 30 and sent in the processing gas supply route 40 is distributed into the supply route at hopper side 40b of the processing gas supply route 40 and the bypass route 44 at the connecting portion 40a of the processing gas supply route 40 when the flow regulation valve 45 is opened, Example of operating control of the flow regulation valve 45 is explained later.

As shown in FIG. 2, the control part 50 has the CPU 51 for controlling each portion of the dehumidifying and drying system A, an operation panel 52 constituting a setting means for setting and for determining a threshold of exhaust temperature, mentioned later, and a memory means 53 for storing the setting conditions operated by the operation panel 52 and control programs.

CPU 51 controls the open degree of the flow regulation valve 45, to be mentioned later, based on the temperature detection signal detected by the exhaust temperature sensor 47 which detects the exhaust air temperature from the hopper body 21. Further, the CPU 51 executes ON/OFF control or PID control of the heater 27 in a manner such that the temperature of the processing gas to be supplied in the hopper body 21 becomes substantially constant based on the temperature detection signal from a supply temperature sensor 46 which detects the temperature of the processing gas (supply air temperature) to be supplied in the hopper body 21 via the heater 27.

Each route 40 to 43 is connected to the cover 32 provided at the upper end and the lower end of the honeycomb rotor 31 and is communicated with the dehumidifying process zone 32a, the heating regenerating zone 32b, and the cooling regenerating zone 32c divided by three partition walls 32d formed with the cover 32.

Namely, as explained below, each route 40 to 43 is designed to communicate with three compartments each of which is airtight (the dehumidifying process zone 32a, the heating regenerating zone 32b, and the cooling regenerating zone 32c), respectively.

The processing gas containing moisture when being passed through a powdered or granular material (m) stored in the hopper body 21 is introduced into the dehumidifying process zone 32a via the diverging pipe at dehumidifying side 41b after cooled down via the circulation filter 37 and the cooler 38 by the main blower 39 provided midway of the processing gas dehumidifying route 41.

The processing gas thus introduced in the dehumidifying process zone 32a passes through the gas flow path provided with the absorbing agent in the honeycomb rotor 31 therein, whereby the moisture is absorbed by the absorbing agent, and is sent to the processing gas supply route 40 as the dehumidified processing gas (dehumidifying process stage).

A part of the processing gas to be sent in the processing gas supply route 40 is distributed into the bypass route 44 to be sent therein when the flow regulation valve 45 is opened. Further, the processing gas which is not sent in the bypass route 44 is heated by the heater 27 and is supplied in the hopper body 21 from the discharge port 24 formed at the downstream end of the processing gas supply route 40.

The absorbing agent in the honeycomb rotor 31 which has contained moisture in the dehumidifying process zone 32 reaches the heating regenerating zone 32b accompanied with rotation of the honeycomb rotor 31.

In the heating regenerating zone 32b, the heating gas for regeneration is introduced via the heating gas route for regeneration 43, the absorbing agent absorbed with moisture is heated and dried, thus the absorbing agent is regenerated (elimination of moisture) (heating regenerating stage).

The heating gas for regeneration passed through the gas flow path provided with an absorbing agent in the honeycomb rotor 31 positioned in the heating regenerating zone 32b via the heating gas route for regeneration 43 is exhausted out of the system.

The absorbing agent in the honeycomb rotor 31 which is heated and regenerated in the heating regenerating zone 32b reaches the cooling regenerating zone 32c accompanied with rotation of the honeycomb rotor 31.

In the cooling regenerating zone 32c, the processing gas sent via the processing gas dehumidifying route 41 is cooled down via the cooler 38, thus cooled gas is distributed by the divergent portion 41a and is introduced via the diverging pipe 41c, thereby cooling and regenerating the heated and regenerated absorbing agent (cooling regenerating stage).

The processing gas is cooled down in order to protect the main blower 39 and to enhance the dehumidifying ability of the absorbing agent (absorption ability of moisture) because the absorbing agent such as synthetic zeolite has such feature that the lower the temperature of the absorbing agent, the higher the moisture absorption amount. Therefore, the cooler 38 is preferably provided upstream of the main blower 39.

The temperature of the processing gas cooled down by the cooler 38 may be around 50 to 70 degrees centigrade.

A well-known cooler such as water cooling type or air cooling type can be used as the cooler 38.

The cooling gas for regeneration passed through the gas flow path provided with the absorbing agent in the honeycomb rotor 31 positioned in the cooling regenerating zone 32c is sent to the cooling gas route for regeneration 42 at downstream of the honeycomb rotor 31, joins together with the processing gas dehumidifying route 41, and is sent to the dehumidifying unit 30.

The processing gas supplied in the hopper body 21 from the discharge port 24 at the lower part in the hopper body 21 upwardly passes through the powdered or granular material (m) stored in the hopper body 21, as mentioned above, and is sent to the processing gas dehumidifying route 41 from the exhaust port 25 formed on the hopper body 21. The processing gas thus sent to the processing gas dehumidifying route 41 is cooled down through the circulation filter 37 and the cooler 38, and passes through the gas flow path having an absorbing agent in the honeycomb rotor 31 positioned in the dehumidifying process zone 32a and the cooling regenerating zone 32c via the diverging pipe at dehumidifying side 41b and the diverging pipe at regenerating side 41c. Accordingly, the processing gas is designed to circulate between the drying hopper unit 20 and the dehumidifying unit 30.

The total amount of the processing gas circulating between the drying hopper unit 20 and the dehumidifying unit 30 including the passing amount in the bypass route 44 and the cooling gas route for regeneration 43 is substantially kept constant.

The reference numeral 48 in FIG. 1 is a temperature sensor for executing ON/OFF control or PID control of the heater for regeneration 36. The reference numeral 49 is a temperature sensor for detecting the temperature of the heating gas for regeneration passed through the heating regenerating zone 32b. The rotation number of the blower for regeneration 35 may be controlled based on the temperature.

As mentioned above, the processing gas dehumidified in the honeycomb rotor 31 of the dehumidifying unit 30 is supplied to the hopper body 21 and a powdered or granular material (m) is dehumidified and dried in this embodiment. Therefore, for example, comparing to the drying apparatus of powdered or granular material in which outer air heated by a heater is directly introduced in a hopper body, the heater can be downsized (saving of electric power) and the drying time is reduced. Namely, when outer air is designed to be heated and directly introduced, a long drying time is required or a large heater is required for drying the powdered or granular material in the hopper body because the dew point of outer air is high, although depending on seasons. However, in this embodiment, a powdered or granular material (m) can be effectively dehumidified and dried by supplying the processing gas of which dew point becomes low when being dehumidified by the honeycomb rotor 31 into the hopper body 21.

Further, by rotating the honeycomb rotor 31, the dehumidifying process of the processing gas, the heating regenerating process of a part of the honeycomb rotor 31 and the cooling regenerating process of a part of the honeycomb rotor 31 are executed in parallel, so that the processing gas with a stable dew point can be supplied in the hopper body 21.

Namely, for example, in a case that the dehumidifying process of the processing gas and regeneration of the honeycomb rotor are repeated in time series, or in a case that the dehumidifying process of the processing gas and regeneration of the absorption tower are executed in parallel by switching a plurality of absorption tower, it is difficult to keep constant the dew point of the processing gas to be supplied in the hopper body. However, according to this embodiment, the processing gas with more stable and substantially same dew point can be supplied in the hopper body, as mentioned later.

This embodiment uses a processing air as gas for dehumidifying and drying, however a processing gas is not limited to air. Gaseous body containing moisture, for example, gas like nitrogen, hydrogen, argon and the like may be dehumidified and dried to be introduced in the drying hopper to dehumidify and dry a powdered or granular material (m).

The temperature and the dew point of the gas to be sent via each route are appropriately determined depending on the kinds and the initial moisture content of a powdered or granular material (m) to be dehumidified and dried, the dimension of the hopper body 21, the output powers of each heater and each blower, the shape of the honeycomb rotor 31 and the like.

Specifically, when synthetic resin pellets which are highly required to have constant low moisture content are dehumidified and dried, the dew point of the dehumidified processing gas may be preferably around −10 to −60 degrees centigrade, more preferably around −40 to −50 degrees centigrade.

Further according to this embodiment, a honeycomb type dehumidifying unit is used and the absorbing body is formed as one honeycomb rotor 31, however, it is not limited such that and the dehumidifying unit may be multi-tower type with a plurality of absorption towers. According to such a multi-tower type, a switch valve may be used for switching each route and each absorption tower, and each route and each absorption tower may be sequentially circulated and communicated by rotating each absorption tower relative to each route. Any type is applicable as far as the circulation route for processing gas is provided, the processing gas is dehumidified and supplied and the absorbing body is regenerated like the present embodiment.

Such a dehumidifying unit of multi-tower type is disclosed in Japanese Patent publication (not examined) JP-S60-178009-A and Japanese Patent publication (not examined) JP-S60-132622-A.

Namely, according to this embodiment, an absorbing body provided for each of the dehumidifying zone, the heating regenerating zone, and the cooling regenerating zone is constituted with one honeycomb rotor 31 and the partition wall 32*d* moves relative to the honeycomb rotor 31 accompanied with rotation of the honeycomb rotor 31. Therefore, each zone is sequentially moved relative to the honeycomb rotor 31. And the dehumidifying process stage for dehumidifying the processing gas, the heating regenerating stage for heating and regenerating a part of the honeycomb rotor, and the cooling regenerating stage for cooling and regenerating a part of the honeycomb rotor can be executed in parallel. On the other hand, according to the above-mentioned multi-tower type, the switch valve switches each route and each absorption tower, or each absorption tower sequentially constitutes each zone by rotating the absorption tower relative to each route, wherein the dehumidifying process stage for dehumidifying the processing gas, the heating regenerating stage for heating and regenerating the absorption tower, and the cooling regenerating stage for cooling and regenerating the absorption tower are executed.

Such a multi-tower type dehumidifying unit is inferior in the view point of stability of the dew point comparing to the honeycomb-type dehumidifying unit of the present invention, however the multi-tower type unit can achieve similar effect by applying the present embodiment.

Figure 9:
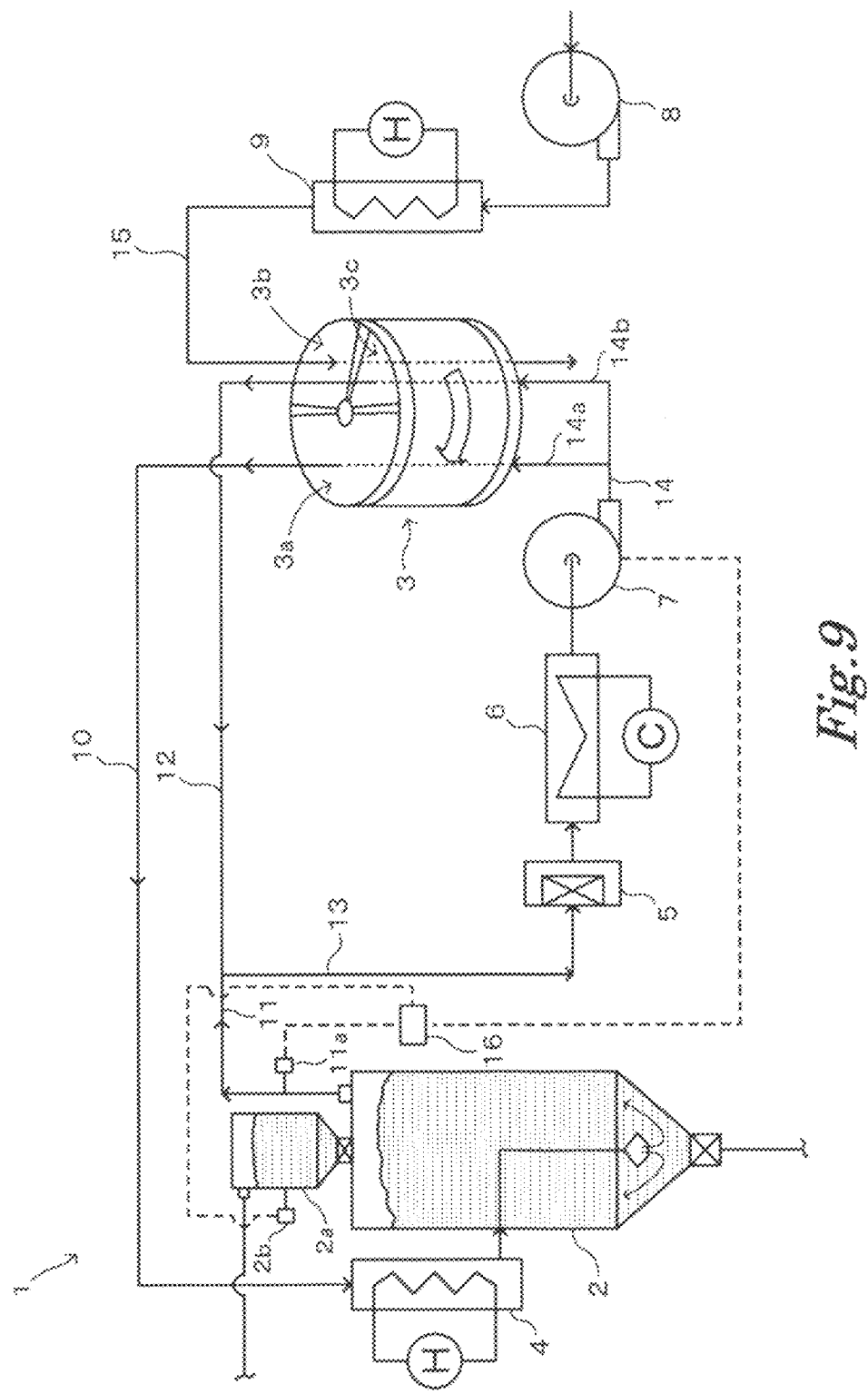
FIG. 9 is a diagrammatic explanatory view schematically showing the conventional dehumidifying and drying apparatus.

Namely, if the multi-tower type dehumidifying unit is designed so as to simply increase or decrease the flow amount of the processing gas to the drying hopper like the prior dehumidifying and drying apparatus explained referring to FIG. 9, the dew point of the processing gas after dehumidifying process does not become steady and becomes unstable.

On the other hand, it is difficult to substantially stabilize the dew point of the processing gas after dehumidifying process, however, if the present embodiment is applied to the multi-tower type dehumidifying unit, supply of the processing gas with a stable dew point which is inherent in multi-tower type dehumidifying unit is not disturbed (the dew point forming wavy line up and down slightly, however hovering while drawing a substantial sine curve and being periodically stable).

Otherwise, the dehumidifying unit may have a plurality of honeycomb rotors. For example, a plural honeycomb rotors may be provided in parallel relative to each route. In such a case, the present invention can be applied when each route is diverged relative to each zone of the plurality of honeycomb rotors.

Or the dehumidifying and drying system may have a plurality of dehumidifying units. For example, a plurality of dehumidifying units may be provided in parallel relative to the drying hopper. In such a case, the processing gas dehumidifying route 41 is diverged at downstream of the bypass route 44 to be connected to the honeycomb rotor of each dehumidifying unit, and the processing gas supply route 40 is diverged at upstream of the bypass route 44 to be connected to the honeycomb rotor of each dehumidifying unit, thereby enabling to apply the present invention.

Further, in the present embodiment, the flow regulation valve 45 provided for the bypass route 44 interconnecting the processing gas supply route 40 and the processing gas dehumidifying route 41 is designed to be controllable of its open degree, however, a simple on-off valve of which open degree is not controllable may be used.

Still further, although only one bypass route 44 is provided in the present embodiment, for example, a plurality of bypass routes 44 may be provided in a manner such that an on-off valve is provided for each bypass route 44, and almost half of the processing gas to be fed to the processing gas supply route is distributed to each one of the plurality of the bypass routes when all of the on-off valves is opened. In this case, the on-off valve may be sequentially controlled to be opened or closed based on the exhaust temperature, as mentioned later, to increase or decrease the flow amount of the processing gas to be supplied to the hopper body 21. Accordingly, the flow amount of the processing gas to be supplied in the hopper body 21 can be gradually increased or decreased.

Still further, instead of the flow regulation valve, a simple on-off valve may be provided such that the on/off control is executed at so high speed that the flow amount via the on-off valve is slightly changed, thereby gradually reducing or gradually increasing the flow amount of the processing gas passing through the bypass pipe 44.

Next, one embodiment of increasing or decreasing the flow amount of the processing gas to be supplied to the hopper body 21 in the dehumidifying and drying system of powdered or granular material A as constructed above is explained referring to FIG. 3.

FIG. 3 shows three conditions of the dehumidifying and drying process of powdered or granular material (m) stored in the hopper body 21, namely a batch operation, a continuous operation and a standby condition.

In FIG. 3a and FIG. 3b, the horizontal axis shows the same time axis. In FIG. 3a, the exhaust temperature from the hopper body 21 is shown on the vertical axis. The solid line in FIG. 3a shows the change in the exhaust temperature when the flow amount of the processing gas to the hopper body 21 is changeable, the two-dotted line shows the change in the exhaust temperature when the flow amount of the processing gas to the hopper body 21 is constant, and in both cases, the supply temperature for executing ON/OFF control or PID control of the heater 27 is same.

In FIG. 3b, the vertical axis shows the open degree of the flow regulation valve 45 provided in the bypass route 44, and the flow amount of the processing gas to be supplied to the hopper body 21. The solid line in FIG. 3b shows the open degree of the flow regulation valve 45, and the two-dotted line shows the change in the flow amount of the processing gas to be supplied to the hopper body 21.

In the embodiment of FIG. 3, the CPU 51 executes control to gradually increase the open degree of the flow regulation valve 45 when the exhaust temperature becomes over the upper threshold limit based on the temperature detection signal of the exhaust temperature sensor 47, and it executes control to gradually decrease the open degree of the flow regulation valve 45 when the exhaust temperature becomes under the lower threshold limit. When the exhaust temperature is between the upper threshold limit and the lower threshold limit, as a decoupling area, the on/off operation of the flow regulation valve 45 is controlled to be stopped (keeping the last open degree). A quiescent period of the flow regulation valve 45 is generated by providing such a decoupling area.

The upper threshold limit and the lower threshold limit may be determined with the operation panel 52 by a user depending on the kinds and the conditions of the powdered or granular material (m) to be dehumidified and dried in the hopper body 21 and may be stored in a memory means 53. Or a plurality of upper threshold limits and lower threshold limits may be determined and stored depending on the kinds and the conditions of the powdered or granular material (m) and may be selected by a user with the operation panel 52. Or only the setting temperature is determined or selected as mentioned above depending on the kinds and the conditions of the powdered or granular material (m) and the value obtained by adding or subtracting a fixed value for the set temperature, thereby obtaining the upper threshold limit or the lower threshold limit.

The batch operation in the figure shows an initial operating condition of the dehumidifying and drying process of the powdered or granular material (m) stored in the hopper body 21 (for example when the dehumidifying and drying system A is started to be operated), wherein the powdered or granular material (m) with moisture at around a room temperature is charged in the hopper body 21 to be a fixed stored amount. The stored amount is controlled by the level gauge provided at the upper part in the hopper body 21 in a manner such that the powdered or granular material (m) is not discharged or charged during the batch operation and is dehumidified and dried until the powdered or granular material (m) at the lower part in the hopper body 21 has a fixed temperature and a fixed moisture content.

The operating time of this batch operation is determined appropriately depending on the dimension of the hopper body 21, the kinds and the conditions of the powdered or granular material (m) and the amount of the powdered or granular material (m) to be discharged sequentially.

Namely, the powdered or granular material (m) stored in the lower layer in the hopper body 21 is gradually heated and dehumidified by the processing gas discharged from the discharge port 24 at the lower part in the hopper body 21 and operation is continued in a manner such that the temperature of about 50 to 70 percent of the powdered or granular material (m) from the lowest layer thereof stored in the hopper body 21 becomes a fixed temperature.

In other words, until at least continuous operation, as mentioned later, is started, a fixed amount of the powdered or granular material (m) to be sequentially discharged from the lowest layer at t continuous operation is well dehumidified and dried and the batch operation is continued before a fixed moisture content is obtained.

In the batch operation, the exhaust temperature is gradually increased from starting operation as shown in FIG. 3a. When starting the batch operation, the flow regulation valve 45 is fully opened as shown in FIG. 3b, namely the flow amount of the processing gas to be supplied to the hopper body 21 is maximum. In other words, all the processing gas to be sent in the processing gas supply route 40 is supplied to the hopper body 21.

When heating and dehumidifying of the powdered or granular material (m) stored in the hopper body 21 are proceeded and the exhaust temperature becomes larger than the upper threshold limit, the flow regulation valve 45 starts to be opened. In this case, the flow regulation valve 45 is opened so as to gradually increase its open degree. When the flow regulation valve 45 is gradually opened, the flow amount of the processing gas to be supplied in the hopper body 21 is gradually decreased. Namely, a part of the processing gas to be sent to the processing gas supply route 40 is circulated to the honeycomb rotor 31 side via the bypass route 44. Thus, the rising speed of the exhaust temperature is gradually decreased.

Gradual increasing control of the open degree of the flow regulation valve 45 is continued as far as the upper threshold limit is exceeded, and the flow amount of the processing gas to the hopper body 21 becomes minimum when it is fully opened. Namely, about a half of the processing gas to be sent to the processing gas supply route 40 is sent to the bypass route 44 and another half thereof is supplied to the hopper body 21.

After the powdered or granular material (m) stored in the lower part in the hopper body 21 is well dehumidified and dried as mentioned above, the operation mode is transferred to continuous operation in which a fixed amount of the powdered or granular material (m) is discharged into a resin molding machine or a temporal storage hopper and the powdered or granular material (m) is charged from the collector 26 depending on the discharged amount.

Such discharge and charge of the powdered or granular material (m) are, for example, periodically repeated depending on the material demand signal from the resin molding machine, the temporal storage hopper and the like.

The discharge temperature is rapidly reduced in the continuous operation because of a newly charged powdered or granular material (m) depending on the discharged amount thereof.

Namely about 50-70 percent of the powdered or granular material (m) from the lowest part of the hopper body 21 has a fixed temperature after being well heated while the batch operation, however, the newly charged powdered or granular material (m) on the upper portion is not well heated and has a low temperature like a room temperature, thereby reducing the exhaust temperature.

When the exhaust temperature becomes under the lower threshold limit by such reduction, the flow regulation valve 45 is controlled to be closed to reduce the open degree. Thus, the flow amount of the processing gas to be supplied to the hopper body 21 is gradually increased, and the exhaust temperature gradually rises, thereby dehumidifying and drying the powdered or granular material (m) in the hopper body 21.

In this continuous operation, accompanied with repeated discharge and charge operations of the powdered or granular material (m), when the exhaust temperature becomes higher than the upper threshold limit, the flow regulation valve 45 is controlled to gradually increase its open degree and when it becomes under the lower threshold limit, the flow regulation valve 45 is controlled to be gradually closed.

When the powdered or granular material (m) is not discharged or charged for a fixed time, such that the demand signal of powdered or granular material (m) from, for example, a resin molding machine, does not exist during the continuous operation, the system becomes a standby condition.

In such a stand-by condition, the exhaust temperature remains in the decoupling area between the upper threshold limit and the lower threshold limit, the flow regulation valve 45 is kept to be fully open, and the flow amount of the processing gas to the hopper body 21 is minimum.

When the flow regulation valve 45 is thus fully open, about a half of the processing gas to be sent to the processing gas supply route 40 is supplied into the hopper body 21. Accordingly, the powdered or granular material (m) in the hopper body 21 is always heated at a suitable temperature and is kept dehumidified and dried. Even when the powdered or granular material (m) is started to be discharged or charged thereafter and the temperature distribution of the powdered or granular material (m) in the hopper body 21 is destroyed, the temperature distribution can be smoothly transferred to a normal condition.

By increasing or decreasing the flow amount of the processing gas to be supplied into the hopper body 21 based on the discharge temperature as mentioned above, the exhaust temperature is prevented from being vainly increased comparing to the case when the flow amount of the processing gas to the hopper body is constant as shown with the two-dotted line in FIG. 3*a*. Namely, it is required to supply a processing gas having a fixed temperature in order to make the powdered or granular material (m) stored in the hopper body 21 a desirable moisture content and it is preferable that the supply temperature is kept constant. In such a case, when the same amount of the processing gas is supplied after enough operation time is spent and the powdered or granular material (m) in the lower portion in the hopper body 21 is dehumidified and dried, the exhaust temperature is vainly increased and there is a possibility that the powdered or granular material (m) is deteriorated (oxidization, burn, decomposition, discoloration, and the like) and the additive agent is scattered when the material (m) is added with additive agent.

Further, when the exhaust temperature is increased uselessly, more burden may be placed on the cooler 38 provided for the processing gas dehumidifying route 41.

In the present embodiment, the flow amount of the processing gas to be supplied in the hopper body 21 based on the exhaust temperature is increased or decreased, so that the above-mentioned problems can be reduced.

Further, when the exhaust temperature exceeds a fixed threshold as mentioned above, the operating rate of the heater 27 for heating the processing gas to be supplied to the hopper body 21 can be reduced by decreasing the flow amount of the processing gas to the hopper body 21, thereby saving electric power. In other words, when the same amount of the processing gas is supplied after enough operation time is spent and the powdered or granular material (m) in the lower portion in the hopper body 21 is dehumidified and dried, the thermal energy of the processing gas to be exhausted from the hopper body 21 is discarded in the cooler 38, thereby wasting energy. However, such a waste can be cut down in this embodiment.

Still further, even when the flow amount of the processing gas into the hopper body 21 is increased or decreased, the flow amount of the processing gas to be introduced in the dehumidifying unit 30 is not increased nor decreased. Therefore, the cooling regenerating process of the honeycomb rotor 31 of the dehumidifying unit 30 after the heating regenerating process is not influenced. Accordingly, the balance of absorption of moisture content by the absorbing agent and its regeneration is not disrupted, thereby enabling to supply the processing gas with a stable dew point to the hopper body 21.

Still further according to this embodiment, the flow amount of the processing gas to be passed through the bypass route 44 is gradually increased when the exhaust temperature from the hopper body 21 becomes higher than the upper threshold limit prepared in advance, on the other hand, the flow amount thereof is gradually decreased when the temperature becomes under the lower threshold limit. Therefore, the flow amount of the processing gas to the bypass route 44 is gradually increased when the temperature exceeds the upper threshold limit and the amount is gradually decreased when the temperature falls below the lower threshold limit.

Namely, the flow amount of the processing gas to the hopper body 21 is gradually reduced when the exhaust temperature becomes over the upper threshold limit and the flow amount thereof is gradually increased when the exhaust temperature becomes under the lower threshold limit. Thus by setting the upper threshold value and the lower threshold value depending on the kinds and the conditions of the powdered or granular material (m) to be dried in advance, the flow amount of the processing gas to be supplied to the hopper body 21 can be increased or decreased based on these threshold values, so that appropriate drying can be effectively executed depending on the material while saving the electric power.

The flow amount of the processing gas to the hopper body 21 is gradually decreased or increased as mentioned above, so that the flow amount does not drastically change. Accordingly, temperature control of the processing gas can be stably followed by means of ON/OFF control of the heater 27. Namely, when the flow amount of the processing gas to the hopper body 21 is rapidly changed, there is a possibility that temperature control of the processing gas by ON/OFF control of the heater 27 cannot follow such change and for example, overshoot or undershoot may be occurred. However, the possibility of such fear cannot be reduced in the present embodiment.

Figure 4:
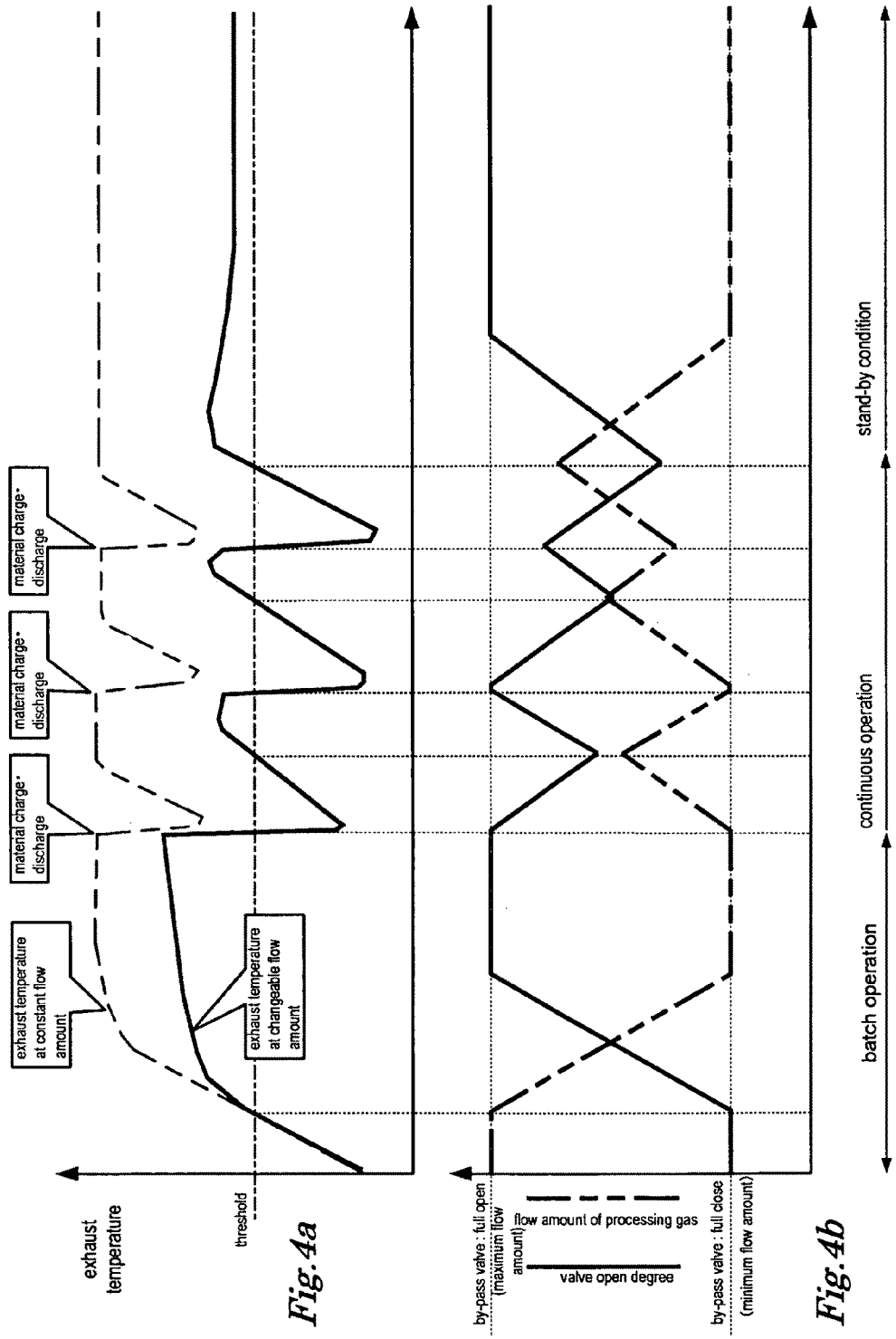
FIG. 4a and FIG. 4b are other example of the time chart corresponding to FIG. 3.

Next, other embodiment of increasing or decreasing the flow amount of the processing gas to be supplied to the hopper body 21 in the dehumidifying and drying system of powdered or granular material A is explained referring to FIG. 4.

The difference with the embodiment explained referring to FIG. 3 is explained here and the same explanation is omitted.

In the embodiment of FIG. 4, the CPU 51 controls to gradually increase the open degree of the flow regulation valve 45 when the exhaust temperature becomes over the threshold based on the temperature detection signal of the exhaust temperature sensor 47, and it controls to gradually decrease the open degree of the flow regulation valve 45 when the exhaust temperature becomes lower than the threshold.

Namely, the open degree of the flow regulation valve 45 is controlled based on only one threshold unlike the embodiment explained referring to FIG. 3.

The threshold value may be determined by a user with the operation panel 52 depending on the kinds and the conditions of the powdered or granular material (m) to be dehumidified and dried in the hopper body 21 and may be stored in a memory means 53. Or a plurality of thresholds may be determined and stored depending on the kinds and the conditions of the powdered or granular material (m) and may be designed to be selected by a user with the operation panel 52.

The embodiment in FIG. 4 is different from the embodiment in FIG. 3 in that the decoupling area is not provided, so that the flow regulation valve 45 is switched from open operation to close operation or from close operation to open operation intervened by the threshold.

The open degree of the flow regulation valve 45 is gradually increased or decreased in a low speed such that it takes one to two hours to be from the fully closed condition to the fully opened condition. The speed can be determined depending on the dimension of the hopper body 21 and the kinds and the conditions of the powdered or granular material (m).

The open degree of the flow regulation valve 45 may be gradually increased or decreased at a constant speed, or its speed may be changeable.

When the flow regulation valve 45 is fully opened in this embodiment, about a half of the processing gas to be sent to the processing gas supply route 40 is designed to be distributed into the bypass route 44 to be sent therein. However, this invention is not limited to such a structure and the flow amount of the processing gas to be distributed in the bypass pipe 44 may be larger than the half or less than the half.

Figure 5:
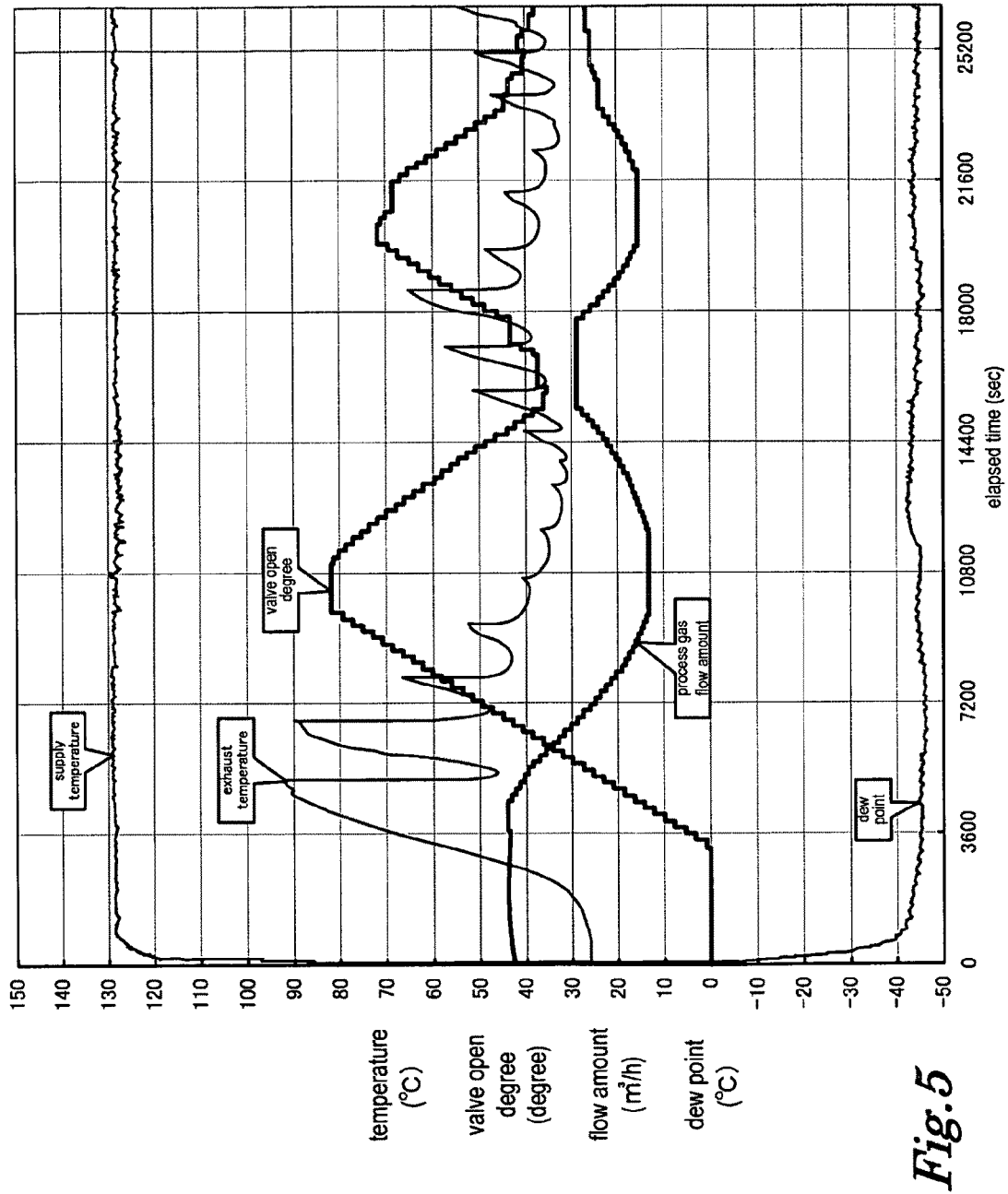
FIG. 5 is a time chart diagrammatically showing one embodiment of the dehumidifying and drying process of powdered or granular material according to the dehumidifying and drying system of powdered or granular material according to the present invention

Next, one embodiment of dehumidifying and drying process of powdered or granular material (m) according to the dehumidifying and drying system of powdered or granular material A of this embodiment is explained referring to FIG. 5.

FIG. 5 is a time chart diagrammatically showing the embodiment and the horizontal axis shows time. The vertical axis shows the exhaust temperature (degrees centigrade), open degree of valve (degree), flow amount of processing gas to the hopper body ($m^3/h$), and dew point (degrees centigrade). Each graph from top to down shows the change in supply air temperature to the hopper body, the change in the exhaust temperature from the hopper body, the change in the flow amount of the processing gas to the hopper body, the change in the valve open degree, and the change in the dew point of the dehumidified processing gas when the elapsed time is 3600 seconds.

This embodiment uses polybutylene terephthalate resin (PBT resin) pellet as powdered or granular material (m) to be stored and dehumidified in the hopper 21.

The heater 27 is controlled such that the temperature (supply air temperature) to be supplied to the hopper body 21 becomes around 130 degrees centigrade.

The required time of the flow regulation valve 45 from full-close to full-open or from full-open to full-close is set about two hours. The flow regulation valve 45 is opened or closed at a stable speed.

The flow amount of the processing gas to be supplied in the hopper body 21 is set about 15 $m^3/h$ when the flow regulation valve 45 is fully opened, and is set about 45 $m^3/h$ when the valve 45 is fully closed. Namely, when the flow regulation valve 45 is fully opened, about ⅔ of the flow amount of the processing gas to be sent in the processing gas supply route 40 via the dehumidifying unit 30 is designed to be distributed and sent in the bypass pipe 44.

The setting temperature of the exhaust air is 40 degrees centigrade, the upper threshold limit is +3 degrees centigrade, namely 43 degrees centigrade, and the lower threshold limit is −3 degrees centigrade, namely 37 degrees centigrade.

The supply air temperature is controlled as mentioned above and transits at almost a constant temperature slightly lower than 130 degrees centigrade, as shown in figure.

The exhaust temperature gradually rises from around 25 degrees centigrade of room temperature and reaches around 90 degrees centigrade when dehumidifying and drying process of the PBT resin proceeds.

When the exhaust temperature exceeds 43 degrees centigrade of the upper threshold limit during heating process, the flow regulation valve 45 starts to open from full-close condition and its open degree gradually becomes large. The flow amount of the processing gas to be supplied to the hopper body 21 is gradually reduced accompanied with opening operation of the flow regulation valve 45.

The exhaust temperature is rapidly decreased when the PBT resin is discharged and charged like each embodiment explained based on FIG. 3 and FIG. 4. Each time the PBT resin is discharged and charged, the exhaust temperature repeats descent and ascent as shown in the figure (at the elapsed time when the exhaust temperature rapidly descends, the PBT resin is discharged and charged).

In this embodiment the flow regulation valve 45 becomes full open before the exhaust temperature becomes under than the lower threshold limit. From such condition, repeating descent and ascent accompanied with discharging and charging of the PBT resin, the exhaust temperature descends to become lower than 37 degrees centigrade of the lower threshold limit, then the flow regulation valve 45 starts close operation from the full-open condition, and its open degree gradually becomes small. Accompanied with the close operation of the flow regulation valve 45, the flow amount of the processing gas to the hopper body 21 is gradually increased. Thus the exhaust temperature gradually rises while repeating descent and ascent accompanied with discharging and charging of the PBT resin. During its heating process, the exhaust temperature exceeds 43 degrees centigrade of the upper threshold limit, as mentioned above, the flow regulation valve 45 starts open operation from full-close condition and the open degree gradually becomes large. In a similar manner, gradual increasing control or gradual decreasing control of the open degree of the flow regulation valve 45 is executed to increase or decrease the flow amount of the processing gas to be supplied to the hopper body 21.

As mentioned above, as the result of increasing or decreasing the flow amount of the processing gas to be supplied to the hopper body 21 based on the exhaust temperature, the dew point of the processing gas dehumidified in the dehumidifying unit 30 becomes stable and transits at substantially constant dew point of −45 degrees centigrade.

When such a processing gas with stable and low dew point is supplied to the hopper body 21, the PBT resin stored in the hopper body 21 can be effectively dehumidified and dried.

The flow amount of the processing gas to be supplied to the hopper body 21 is increased or decreased depending on the exhaust temperature, so that the electric power can be saved as mentioned above.

Next, other embodiment of the present invention is explained referring to drawings.

Figure 6:
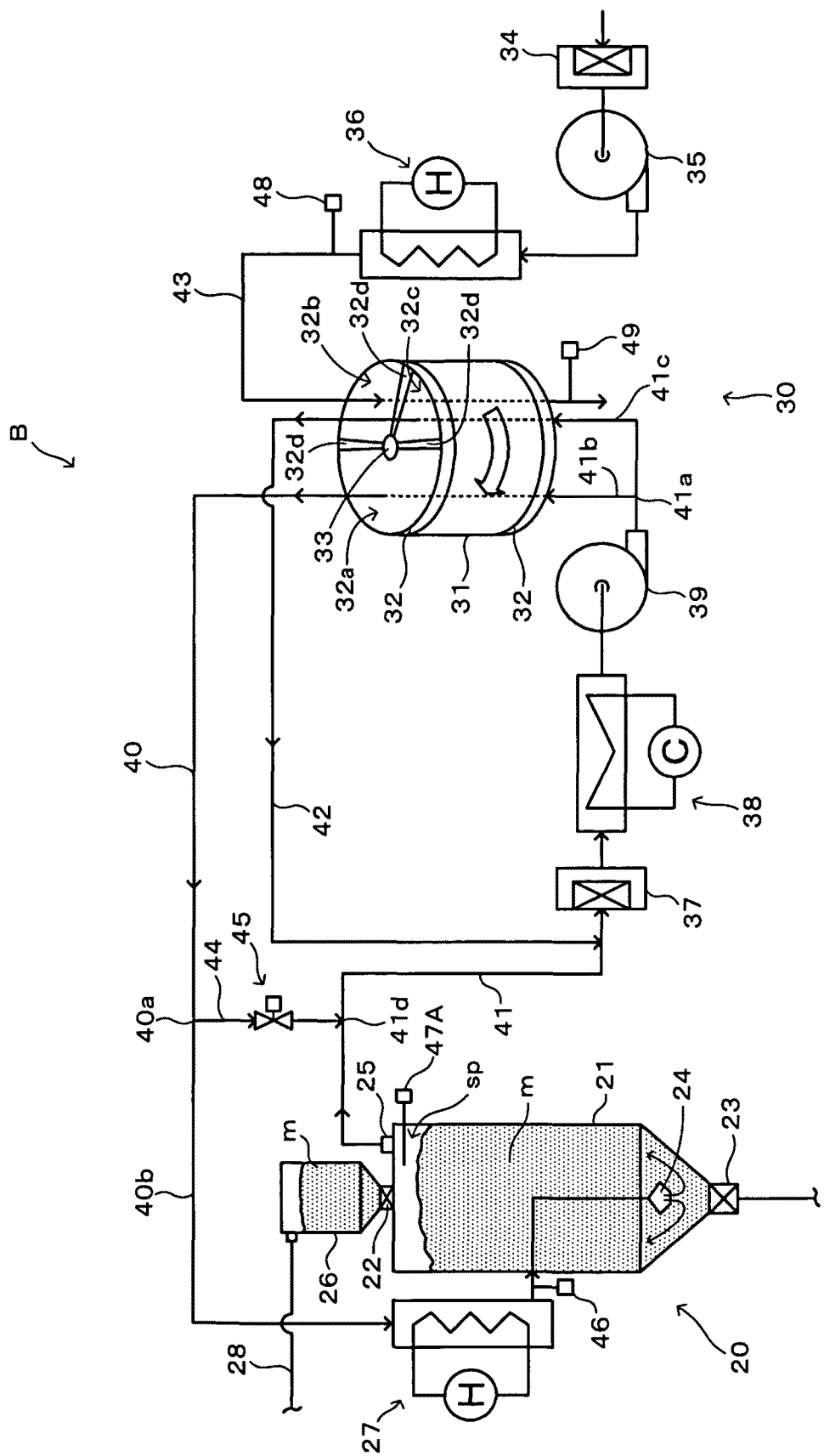
FIG. 6 is a diagrammatic explanatory view schematically showing other embodiment of the dehumidifying and drying system of powdered or granular material according to the present invention.
Figure 7:
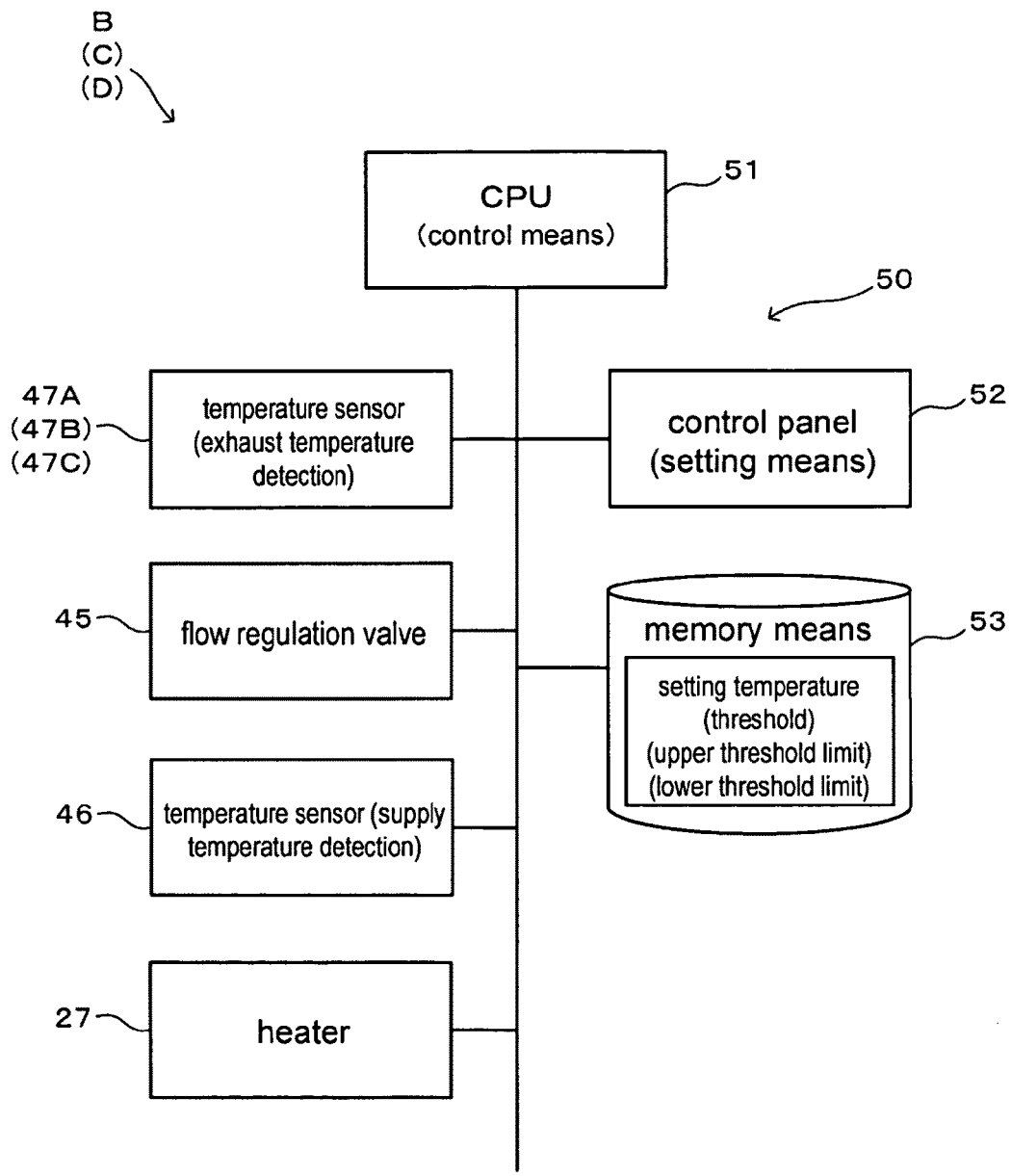
FIG. 7 is a block diagram showing the internal structure of the dehumidifying and drying system of powdered or granular material according to the embodiment in FIG. 6.

FIG. 6 is a diagrammatic explanatory view schematically showing the second embodiment of the dehumidifying and drying system of powdered or granular material. FIG. 7 is a block diagram showing the internal structure of the dehumidifying and drying system of powdered or granular material according to the embodiment.

The difference from the first embodiment is mainly explained, the same structures have the same reference numerals and their explanation is omitted or briefly done.

According to the dehumidifying and drying system of powdered or granular material B of the present embodiment, the provided position of the temperature sensor producing the temperature detection signal for adjusting the flow amount of the processing gas to be passed through the bypass route 44 is different from that of the dehumidifying and drying system of powdered or granular material A of the first embodiment.

Namely, in this embodiment, a temperature sensor for upper part 47A is provided for detecting the temperature of the upper part in the hopper body 21 instead of the exhaust temperature sensor 47 provided for the processing gas dehumidifying route 41.

The temperature sensor for upper part 47A is provided in a manner such that the detecting part faces the space between the uppermost layer of the powdered or granular material (m) and a canopy thereof closing the upper end of the hopper body 21 when the powdered or granular material (m) stored in the hopper body 21 is full level.

Namely, the temperature sensor for upper part 47A measures the atmospheric temperature of the space (abbreviated to non-storage space of material) sp above the powdered or granular material layer stored in the hopper body.

The temperature of the non-storage space of material (sp) in the hopper body 21 transits similar to the temperature change in the exhaust temperature while repeating descent and ascent accompanied with discharging and charging of a powdered or granular material (m) like the change in the exhaust temperature in each embodiment explained based on FIG. 3 or FIG. 4.

Thus the hot processing gas discharged to the hopper body 21 from the discharge port 24 at the lower part of the hopper body 21 upwardly passes through the powdered or granular material (m) stored in the hopper body 21 and is exhausted out of the hopper body 21 through the exhaust port 25. In this case the processing gas exchanges heat with the powdered or granular material (m) stored in the hopper body 21 (specifically, the powdered or granular material which is stored at the upper layer and is not well heated, or a newly charged powdered or granular material), so that the temperature in the non-storage space of material (sp) once descends by newly charging a powdered or granular material (m) in the hopper body 21 and gradually rises by being heated with the supplied processing gas.

Also according to the dehumidifying and drying system of powdered or granular material B according to such constructed embodiment, like each embodiment explained based on FIG. 3 or FIG. 4, the flow amount of the processing gas to be supplied to the hopper body 21 is increased or decreased based on the temperature detection signal detected by the temperature sensor for upper part 47A.

Namely, as shown in FIG. 7, THE CPU 51 of the control part 50 controls such that the open degree of the flow regulation valve 45 is increased or decreased based on the temperature detection signal detected by the temperature sensor for upper part 47A and the flow amount of the processing gas to be supplied to the hopper body 21 is increased or decreased, as mentioned above.

The dehumidifying and drying system of powdered or granular material B according to such constructed embodiment can achieve the same effect as the dehumidifying and drying system of powdered or granular material A according to the first embodiment.

Figure 8:
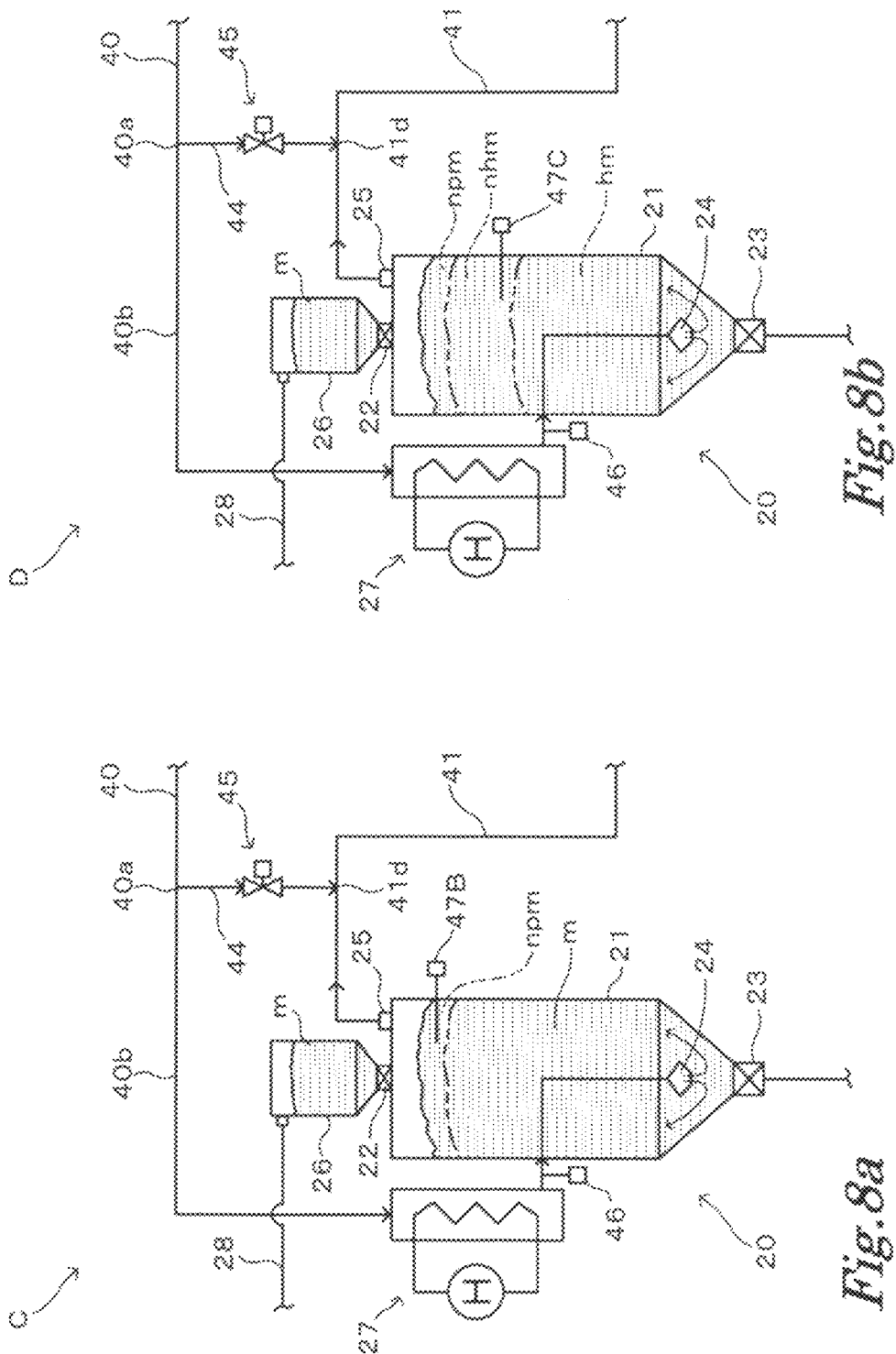
FIG. 8a and FIG. 8b are partial explanatory views diagrammatically showing one modification of the dehumidifying and drying system of powdered or granular material according to the embodiment in FIG. 6.

Next, a modified embodiment of the dehumidifying and drying system of powdered or granular material according to this embodiment is explained based on FIG. 8.

FIG. 8*a* and FIG. 8*b* are schematic partial explanatory views diagrammatically showing one modification of the dehumidifying and drying system of powdered or granular material according to the embodiment.

The difference with the first and second embodiments is mainly explained, the same structures have the same reference numerals and their explanation is omitted or simplified.

FIG. 8*a* and FIG. 8*b* do not show the dehumidifying unit, however it is provided like each embodiment mentioned above.

The internal structure of the dehumidifying and drying system of powdered or granular material in each embodiment mentioned below is same as that in the above-mentioned dehumidifying and drying system B explained based on FIG. 7, and the reference numerals are shown in FIG. 7 and their explanation is omitted.

The dehumidifying and drying system of powdered or granular material C in the first modified embodiment in FIG. 8*a* is different from the dehumidifying and drying system of powdered or granular material B of the second embodiment in that where a temperature sensor for upper part 47B is provided.

In this modified embodiment, the temperature sensor for upper part 47B is provided lower than the temperature sensor for upper part 47A in the hopper body 21 of the above-mentioned embodiment.

Namely, the temperature sensor for upper part 47B is provided in a manner such that the detection part is positioned in the powdered or granular material of the upper layer of the powdered or granular material stored in the hopper body 21 and detects the temperature of the upper layer of the powdered or granular material, actually the temperature of powdered or granular material (npm) in the powdered or granular material layer.

The powdered or granular material (npm) in the upper layer is a newly charged powdered or granular material from the collector 26 depending on the discharged amount of the powdered or granular material (m) when the material discharge valve 23 under the hopper body 21 is opened during the continuous operation. In other words, the powdered or granular material (npm) is the powdered or granular material newly charged and stored to a fixed full level from the material charge start level where material is started to be charged from the collector 2*b* when the storage level of the powdered or granular material (m) in the hopper body 21 is reduced by being discharged from the lower part.

Thus newly charged powdered or granular material (npm) is, for example, at around a room temperature just after being charged, and the temperature is gradually increased by the processing gas supplied in the hopper body 21. The temperature of the powdered or granular material (npm) transits within the temperature change like the exhaust temperature explained referring to the first embodiment and the temperature of the non-storage space of material (sp) of the above-mentioned embodiment.

Namely, the temperature of the powdered or granular material (npm) is gradually increased from the temperature around room temperature just after being charged accompanied with dehumidifying and drying process by supplying the processing gas. The temperature of the powdered or granular material (npm) is measured by the temperature sensor for upper part 47B and the open degree of the flow regulation valve 45 is controlled to be increased or decreased depending on the temperature detection signal and the flow amount of the processing gas to be supplied in the hopper body 21 is increased or decreased as mentioned above.

In such an embodiment, the same effect as the dehumidifying and drying system of powdered or granular material A in the first embodiment can be achieved.

Further, the temperature of the powdered or granular material (npm) just after being charged is directly measured, so that descent of temperature accompanied with charging can be quickly detected rather than each embodiment mentioned above.

The dehumidifying and drying system of powdered or granular material D in the second modified embodiment in FIG. 8b is different from the dehumidifying and drying system of powdered or granular material C of the first modified embodiment in that where a temperature sensor for upper part 47C is provided.

Namely in this modified embodiment, the temperature sensor for upper part 47C is provided lower than the temperature sensor for upper part 47B of the above-mentioned first modified embodiment in the hopper body 21.

The temperature sensor for upper part 47C is provided in a manner such that the detection part is positioned in the powdered or granular material layer under heating process during the continuous operation after the batch operation to detect the temperature of the powdered or granular layer which is stored and is under the heating process in the upper layer, actually the temperature of powdered or granular material (nhm) in the powdered or granular material layer.

The powdered or granular material (nhm) is material of which temperature is not yet well heated during the batch operation and the continuous operation and has lower temperature than that of the powdered or granular material (hm) in the lower layer which is well heated to reach a fixed setting temperature during the batch operation.

More specifically, powdered or granular material (hm) in the lower layer is heated to a fixed temperature before the continuous operation like each embodiment explained based on FIG. 3 or FIG. 4, however, the powdered or granular material (nhm) stored in the upper layer is not heated to a fixed temperature during the batch operation and the continuous operation.

Namely, the temperature distribution of the powdered or granular material stored in the hopper body 21 is almost at constant setting temperature in the upper layer, however, it is decreased toward the top layer in the upper part in the lower layer. In other words, almost all of the powdered or granular material (hm) stored in the lower layer reaches the setting temperature after the batch operation or during the continuous operation. On the other hand, the powdered or granular material (nhm) stored in the upper part on the powdered or granular material (hm) in the lower layer and the newly charged powdered or granular material (npm) are under heating process and do not reach the setting temperature, and they are layered in a manner such that the temperature is gradually decreased toward the top layer.

The temperature of powdered or granular material (nhm) under the above-mentioned heating process transits while repeating descent and ascent accompanied with discharging and charging of a powdered or granular material.

Namely, the powdered or granular material having a lower temperature among the powdered or granular material (nhm) under heating process goes down around the detection part of the temperature sensor for upper part 47C accompanied with discharging of a part of the powdered or granular material (hm) in the lower layer from the lower part of the hopper body 21. The descended powdered or granular material (nhm) is gradually heated by the processing gas supplied from the discharge port 24 like the above-mentioned embodiment, thereby increasing the temperature.

In this modified embodiment, the temperature of the powdered or granular material (nhm) under heating process is measured, and the open degree of the flow regulation valve 45 is controlled to increase or decrease based on the temperature detection signal of the temperature sensor for upper part 47D like the above-mentioned embodiment, thereby increasing or decreasing the flow amount of the processing gas to be supplied to the hopper body 21.

In this embodiment, each threshold value explained in the above-mentioned each embodiment is set higher than that in the above-mentioned embodiment because the temperature does not rapidly descend by a newly charged powdered or granular material and the temperature of the powdered or granular material (nhm) which is heated to some extent is measured.

The modified embodiment can achieve the same effect as the dehumidifying and drying system of powdered or granular material A according to the first embodiment.

Specifically, the flow amount of the processing gas to be supplied to the hopper body 21 is increased or decreased based on the temperature of the powdered or granular material (nhm) under heating process, thereby executing accurate and minute control with small up-down width of the detected temperature change comparing to each embodiment mentioned above.

Further, the flow amount of the processing gas to be supplied to the hopper body 21 is increased or decreased depending on the temperature of the powdered or granular material (nhm) before being transferred to the lower layer accompanied with discharge from the lower part of the hopper body 21, thereby controlling the powdered or granular material (hm) in the lower layer to be a fixed setting temperature. In other words, the flow amount of the processing gas to be supplied to the hopper body 21 is adjusted based on the temperature of the powdered or granular material (nhm) under heating procedure which is placed in a pre-stage of the powdered or granular material (hm) at the lower layer and is required to be a fixed setting temperature, thereby enabling to control a preferable temperature distribution of the powdered or granular material in the hopper body 21.

The amount of the powdered or granular material (hm) at the lower layer and the amount of the powdered or granular material (nhm) under heating process are appropriately set depending on the discharge amount and the discharge condition (discharge frequency) from the lower part of the hopper body 21 in this modified embodiment. Namely, it is only necessary to set the amount of the powdered or granular material (hm) in the lower layer and the amount of the powdered or granular material (nhm) under heating process in a manner such that a fixed amount of the powdered or granular material at the lowest layer to be discharged responsive to the material demand signal from the molding machine is always well dehumidified and dried.

In the above-mentioned second embodiment and in each modified embodiment, the temperature sensor for upper part to detect the temperature in the upper part in the hopper body 21 is provided from the side wall of the hopper body 21 into the inside, however, it may be provided from the canopy to the inside of the hopper body 21.

The invention claimed is:

1. A method of dehumidifying and drying powdered or granular material using a system for dehumidifying and drying powdered or granular material, said system comprising a drying hopper for storing therein and drying a powdered or granular material, a dehumidifying unit equipped with an absorbing body therein, and a circulation route having a processing gas supply route and a processing gas dehumidifying route that interconnect said drying hopper and said dehumidifying unit, a processing gas being repeatedly circulated for dehumidifying and drying by being returned to said dehumidifying unit from said drying hopper via the processing gas dehumidifying route after being heated by a heater and allowed to pass through said drying hopper, said processing gas supply route being configured to connect a downstream side of said absorbing body of said dehumidifying unit and an upstream side of said heater of said drying hopper such that processing gas dehumidified and processed by said dehumidifying unit is supplied toward said drying hopper;

said processing gas dehumidifying route being configured to connect a downstream side of said drying hopper and an upstream side of the absorbing body of said dehumidifying unit such that gas passing through said drying hopper is supplied toward said dehumidifying unit;

said method comprising the following process:

a dehumidifying process in which the processing gas exhausted from said drying hopper is dehumidified with said absorbing body in said dehumidifying unit by allowing the processing gas to pass through said absorbing body;

a heating regenerating process in which a heating gas is allowed to pass through said absorbing body for its own reuse after said dehumidifying process; and a cooling regenerating process in which a cooling gas is allowed to pass through said absorbing body for its own reuse after said heating regenerating process;

whereby the flow amount of the processing gas to pass through a bypass route, which interconnects midway of the processing gas supply route and midway of the processing gas dehumidifying route and supplies a part of dehumidified processing gas supplied to said heater and said drying hopper through said processing gas supply route without passing through said heater and said drying hopper, is adjusted depending on the temperature of the processing gas exhausted from said drying hopper under the condition that the total circulation amount of the processing gas circulating in said circulation route, including the amount of the gas passing through the bypass route, is substantially kept a predetermined amount, and thereby performing control of increasing or decreasing the flow amount of the processing gas to supply to said drying hopper.

2. The method of dehumidifying and drying powdered or granular material as set forth in claim 1, wherein a regulation valve is further provided in said bypass route for adjusting the passing amount of the processing gas, and wherein the amount of the processing gas to pass through said bypass route is adjusted by open or close operation of said regulation valve depending on the temperature of the processing gas exhausted from said drying hopper.

3. The method of dehumidifying and drying powdered or granular material as set forth in claim 2, wherein the amount of the processing gas is adjusted by open or close operation of said regulation valve in such a manner that the amount of the processing gas to pass through said bypass route is gradually increased when the temperature of the processing gas exhausted from said drying hopper exceeds a predetermined threshold value as set in advance, on the other hand is gradually decreased when the temperature thereof becomes below said threshold value.

4. A method of dehumidifying and drying powdered or granular material using a system for dehumidifying and drying powdered or granular material, said system comprising a drying hopper for storing therein and drying a powdered or granular material, a dehumidifying unit equipped with an absorbing body therein, and a circulation route having a processing gas supply route and a processing gas dehumidifying route that interconnect said drying hopper and said dehumidifying unit, a processing gas being repeatedly circulated for dehumidifying and drying by being returned to said dehumidifying unit from said drying hopper via the processing gas dehumidifying route after being heated by a heater and allowed to pass through said drying hopper, said processing gas supply route being configured to connect a downstream side of said absorbing body of said dehumidifying unit and an upstream side of said heater of said drying hopper such that processing gas dehumidified and processed by said dehumidifying unit is supplied toward said drying hopper;

said processing gas dehumidifying route being configured to connect a downstream side of said drying hopper and an upstream side of the absorbing body of said dehumidifying unit such that gas passing through said drying hopper is supplied toward said dehumidifying unit;

said method comprising the following process;

a dehumidifying process in which the processing gas exhausted from said drying hopper is dehumidified with said absorbing body in said dehumidifying unit by allowing the processing gas to pass through said absorbing body;

a heating regenerating process in which a heating gas is allowed to pass through said absorbing body for its own reuse after said dehumidifying process; and a cooling regenerating process in which a cooling gas is allowed to pass through said absorbing body for its own reuse after said heating regenerating process;

whereby the flow amount of the processing gas to pass through a bypass route, which interconnects midway of the processing gas supply route and midway of the processing gas dehumidifying route and supplies a part of dehumidified processing gas supplied to said heater and said drying hopper through said processing gas supply route without passing through said heater and said drying hopper, is adjusted depending on the temperature in an upper part of said drying hopper under the condition that the total circulation amount of the processing gas circulating in said circulation route, including the amount of the gas passing through the bypass route, is substantially kept a predetermined amount, and thereby performing control of increasing or decreasing the flow amount of the processing gas to supply to said drying hopper.

5. The method of dehumidifying and drying powdered or granular material as set forth in claim 4, wherein said upper part of said drying hopper is a space above a layer of a powdered or granular material stored in said drying hopper, where said temperature in said upper part of said drying hopper is detected for adjusting the flow amount of the processing gas to pass through said bypass route.

6. The method of dehumidifying and drying powdered or granular material as set forth in claim 4, wherein said upper part of said drying hopper is the upper layer of a powdered or granular material stored in said drying hopper, where said temperature in said upper part of said drying hopper is detected for adjusting the flow amount of the processing gas to pass through said bypass route.

7. The method of dehumidifying and drying powdered or granular material as set forth in any one of claims 4 to 6, wherein a regulation valve is further provided in said bypass route for adjusting the passing amount of the processing gas, and wherein the amount of the processing gas to pass through said bypass route is adjusted by open or close operation of said regulation valve depending on the temperature in said upper part of said drying hopper.

8. The method of dehumidifying and drying powdered or granular material as set forth in claim 7, wherein the amount of the processing gas is adjusted by open or close operation of said regulation valve in such a manner that the amount of the processing gas to pass through said bypass route is gradually increased when the temperature in said upper part of said drying hopper exceeds a predetermined threshold value as set in advance, on the other hand is gradually decreased when the temperature therein becomes below said threshold value.

9. The method of dehumidifying and drying powdered or granular material as set forth in any one of claims 1 to 6, wherein:
   said absorbing body is composed of a dehumidifying rotor like a honeycomb in which a plurality of gas flow paths are formed; and wherein
   said dehumidifying rotor is divided into three zones around its rotary axis, a dehumidifying process zone, a heating regeneration zone, and a cooling regeneration zone, each of which the processing gas, the heating gas, or the cooling gas is passed through while rotating said dehumidifying rotor continuously, thereby performing in parallel said dehumidifying process, said heating regenerating process for a part of said dehumidifying rotor and said cooling regenerating process for a part of said dehumidifying rotor.

10. A system for dehumidifying and drying powdered or granular material comprising a drying hopper for storing therein and drying a powdered or granular material, a dehumidifying unit equipped with an absorbing body therein, and a circulation route having a processing gas supply route and a processing gas dehumidifying route that interconnect said drying hopper and said dehumidifying unit, a processing gas being repeatedly circulated for dehumidifying and drying by being returned to said dehumidifying unit from said drying hopper via the processing gas dehumidifying route after being heated by a heater and allowed to pass through said drying hopper,
   said processing gas supply route being configured to connect a downstream side of said absorbing body of said dehumidifying unit and an upstream side of said heater of said drying hopper such that processing gas dehumidified and processed by said dehumidifying unit is supplied toward said drying hopper;
   said processing gas dehumidifying route being configured to connect a downstream side of said drying hopper and an upstream side of the absorbing body of said dehumidifying unit such that gas passing through said drying hopper is supplied toward said dehumidifying unit;
   said system comprising:
   a bypass route with a regulation valve for supplying a part of dehumidified processing gas supplied to said heater and said drying hopper through said processing gas supply route without passing through said heater and said drying hopper, said bypass route interconnecting midway of the processing gas supply route and midway of the processing gas dehumidifying route;
   a temperature sensor provided in the processing gas dehumidifying route, for detecting the temperature of the processing gas exhausted from said drying hopper;
   said dehumidifying unit comprising:
      a dehumidifying process zone for dehumidifying the processing gas exhausted from said drying hopper, so constructed as to allow said processing gas to pass through said absorbing body;
      a heating regenerating zone so constructed as to allow a heating gas to pass through said absorbing body for reuse of said absorbing body after the processing gas is dehumidified;
      a cooling regenerating zone so constructed as to allow a cooling gas to pass through said absorbing body for reuse of said absorbing body after said absorbing body is regenerated by said heating gas; and an inlet and
      an outlet for introducing and passing the processing gas, said heating gas, and said cooling gas into and out of said dehumidifying process zone, said heating regenerating zone, and said cooling regenerating zone, respectively, and
   a control means for controlling open or close operation of said regulation valve provided in said bypass route depending on the temperature detection signal from said temperature sensor under the condition that the total circulation amount of the processing gas circulating in said circulation route, including the amount of the processing gas passing through said bypass route, is substantially kept a predetermined amount.

11. A system for dehumidifying and drying powdered or granular material comprising a drying hopper for storing therein and drying a powdered or granular material, a dehumidifying unit equipped with an absorbing body therein, and a circulation route having a processing gas supply route and a processing gas dehumidifying route that interconnect said drying hopper and said dehumidifying unit, a processing gas being repeatedly circulated for dehumidifying and drying by being returned to said dehumidifying unit from said drying hopper via the processing gas dehumidifying route after being heated by a heater and allowed to pass through said drying hopper,
   said processing gas supply route being configured to connect a downstream side of said absorbing body of said dehumidifying unit and an upstream side of said heater of said drying hopper such that processing gas dehumidified and processed by said dehumidifying unit is supplied toward said drying hopper;
   said processing gas dehumidifying route being configured to connect a downstream side of said drying hopper and an upstream side of the absorbing body of said dehumidifying unit such that gas passing through said drying hopper is supplied toward said dehumidifying unit;
   said system comprising;
   a bypass route with a regulation valve for supplying a part of dehumidified processing gas supplied to said heater and said drying hopper through said processing gas supply route without passing through said heater and said drying hopper, said bypass route interconnecting midway of the processing gas supply route and midway of the processing gas dehumidifying route,
   a temperature sensor provided in said drying hopper, for detecting the temperature in an upper part of said drying hopper;
   said dehumidifying unit comprising:
      a dehumidifying process zone for dehumidifying the processing gas exhausted from said drying hopper, so constructed as to allow said processing gas to pass through said absorbing body;

a heating regenerating zone so constructed as to allow a heating gas to pass through said absorbing body for reuse of said absorbing body after the processing gas is dehumidified;

a cooling regenerating zone so constructed as to allow a cooling gas to pass through said absorbing body for reuse of said absorbing body after said absorbing body is regenerated by said heating gas; and an inlet and an outlet for introducing and passing the processing gas, said heating gas, and said cooling gas into and out of said dehumidifying process zone, said heating regenerating zone, and said cooling regenerating zone, respectively, and a control means for controlling open or close operation of said regulation valve provided in said bypass route depending on the temperature detection signal from said temperature sensor under the condition that the total circulation amount of the processing gas circulating in said circulation route, including the amount of the processing gas passing through said bypass route, is substantially kept a predetermined amount.

12. The system of dehumidifying and drying powdered or granular material as set forth in claim 11, wherein said temperature sensor is provided for detecting the temperature in a space above the layer of the powdered or granular material stored in said drying hopper.

13. The system of dehumidifying and drying powdered or granular material as set forth in claim 11, wherein said temperature sensor is provided for detecting the temperature in the upper layer of the powdered or granular material stored in said drying hopper.

14. The system of dehumidifying and drying powdered or granular material as set forth in any one of claims 10 to 13, wherein:

said absorbing body is composed of a dehumidifying rotor like a honeycomb in which a plurality of gas flow paths are formed; wherein said dehumidifying rotor has at its both ends:

a partition means for dividing said dehumidifying rotor into three zones around its rotary axis;

a dehumidifying process zone, a heating regenerating zone, and a cooling regenerating zone, and an inlet and an outlet correspondingly provided for each of said three zones to pass through the processing gas, said heating gas, and said cooling gas respectively; and wherein said dehumidifying rotor is continuously rotated for executing in parallel a dehumidifying process for the processing gas, a heating regenerating process for a part of said dehumidifying rotor and a cooling regenerating process for a part of said dehumidifying rotor.

15. The system of dehumidifying and drying powdered or granular material as set forth in any one of claims 10 to 13, wherein said regulation valve is so constructed to be adjustable in its open degree.

16. The system of dehumidifying and drying powdered or granular material as set forth in claim 15, wherein a memory means is further provided in which a threshold value is stored in advance, and wherein said control means is constructed such that the open degree of the regulation valve is gradually increased as the temperature detection signal value from said temperature sensor exceeds a predetermined threshold value, on the other hand, is gradually decreased as the temperature detection signal value from said temperature becomes below said predetermined threshold value.

17. The method of dehumidifying and drying powdered or granular material as set forth in claim 7, wherein:

said absorbing body is composed of a dehumidifying rotor like a honeycomb in which a plurality of gas flow paths are formed; and wherein said dehumidifying rotor is divided into three zones around its rotary axis, a dehumidifying process zone, a heating regeneration zone, and a cooling regeneration zone, each of which the processing gas, the heating gas, or the cooling gas is passed through while rotating said dehumidifying rotor continuously, thereby performing in parallel said dehumidifying process, said heating regenerating process for a part of said dehumidifying rotor and said cooling regenerating process for a part of said dehumidifying rotor.

18. The method of dehumidifying and drying powdered or granular material as set forth in claim 8, wherein:

said absorbing body is composed of a dehumidifying rotor like a honeycomb in which a plurality of gas flow paths are formed; and wherein said dehumidifying rotor is divided into three zones around its rotary axis, a dehumidifying process zone, a heating regeneration zone, and a cooling regeneration zone, each of which the processing gas, the heating gas, or the cooling gas is passed through while rotating said dehumidifying rotor continuously, thereby performing in parallel said dehumidifying process, said heating regenerating process for a part of said dehumidifying rotor and said cooling regenerating process for a part of said dehumidifying rotor.

19. The system of dehumidifying and drying powdered or granular material as set forth in claim 14, wherein said regulation valve is so constructed to be adjustable in its open degree.

20. The system of dehumidifying and drying powdered or granular material as set forth in claim 19, wherein a memory means is further provided in which a threshold value is stored in advance, and wherein said control means is constructed such that the open degree of the regulation valve is gradually increased as the temperature detection signal value from said temperature sensor exceeds a predetermined threshold value, on the other hand, is gradually decreased as the temperature detection signal value from said temperature becomes below said predetermined threshold value.

* * * * *